US012755651B2

(12) United States Patent
Tavernini et al.

(10) Patent No.: US 12,755,651 B2
(45) Date of Patent: Oct. 6, 2026

(54) INTEGRATED NEUTRALIZER AND ANNULAR FILTER HOUSING FOR A REGIONAL LUNG DEPOSITION FILTER

(71) Applicant: The Governors of the University of Alberta, Edmonton (CA)

(72) Inventors: Scott Evan Tavernini, Edmonton (CA); Warren H. Finlay, Edmonton (CA); Andrew R. Martin, Edmonton (CA)

(73) Assignee: The Governors of the University of Alberta, Edmonton (CA)

( * ) Notice: Subject to any disclaimer, the term of this patent is extended or adjusted under 35 U.S.C. 154(b) by 340 days.

(21) Appl. No.: 18/568,466

(22) PCT Filed: Jun. 20, 2022

(86) PCT No.: PCT/CA2022/050987
§ 371 (c)(1),
(2) Date: Dec. 8, 2023

(87) PCT Pub. No.: WO2022/261789
PCT Pub. Date: Dec. 22, 2022

(65) Prior Publication Data

US 2024/0274037 A1 Aug. 15, 2024

Related U.S. Application Data

(60) Provisional application No. 63/212,217, filed on Jun. 18, 2021.

(51) Int. Cl.
*G09B 23/30* (2006.01)

(52) U.S. Cl.
CPC .................................... *G09B 23/30* (2013.01)

(58) Field of Classification Search
None
See application file for complete search history.

(56) References Cited

U.S. PATENT DOCUMENTS 11,740,161 B2 * 8/2023 Finlay .................... G09B 23/30
2007/0006876 A1 1/2007 Finlay et al.
(Continued)

FOREIGN PATENT DOCUMENTS

WO 2019109192 A1 6/2019
WO 2020079779 A1 4/2020
WO 2020217259 A1 10/2020

OTHER PUBLICATIONS

Supplementary EP Search Report for EP22823754, dated Feb. 7, 2025.
(Continued)

*Primary Examiner* — Daniel S Larkin
(74) *Attorney, Agent, or Firm* — MaxGoLaw PLLC

(57) ABSTRACT

A regional lung deposition system including a throat simulation device, an electrostatic neutralizer, and a first filter positioned within a first filter housing. The electrostatic neutralizer is positioned downstream of an in fluid communication with the throat simulation device. The filter housing is positioned downstream of and in fluid communication with the electrostatic neutralizer. The first filter that is positioned within the filter housing is downstream of the throat simulation device and the electrostatic neutralizer. The regional lung deposition system mimics tracheobronchial (TB) deposition of pharmaceutical aerosols emitted by commercially available dry powder inhalers (DPIs) to provide an in vitro method to rapidly evaluate regional lung doses delivered by pharmaceutical inhalers directly using variable inhalation profiles.

20 Claims, 26 Drawing Sheets

(56) References Cited

U.S. PATENT DOCUMENTS

| | | | |
|---|---|---|---|
| 2012/0325084 A1 | 12/2012 | Sexton et al. | |
| 2014/0137523 A1* | 5/2014 | Ikeda | B01D 46/0002 55/489 |
| 2020/0150110 A1 | 5/2020 | Kerr et al. | |
| 2020/0160752 A1 | 5/2020 | Lin et al. | |
| 2020/0394937 A1 | 12/2020 | Chen et al. | |
| 2021/0209969 A1 | 7/2021 | Namima et al. | |

OTHER PUBLICATIONS

Ryzucki, et al., "Combined in Vitro-in Silico Approach to Predict Deposition and Pharmacokinetics of Budesonide Dry Powder Inhalers", Pharmaceutical Research, Springer Berlin Heidelberg, Berlin/Heidelberg, vol. 37, No. 10, Sep. 29, 2020.

Int'l Search Report for PCT/CA2022/050987, dated Sep. 22, 2022.

* cited by examiner

FIG. 3C
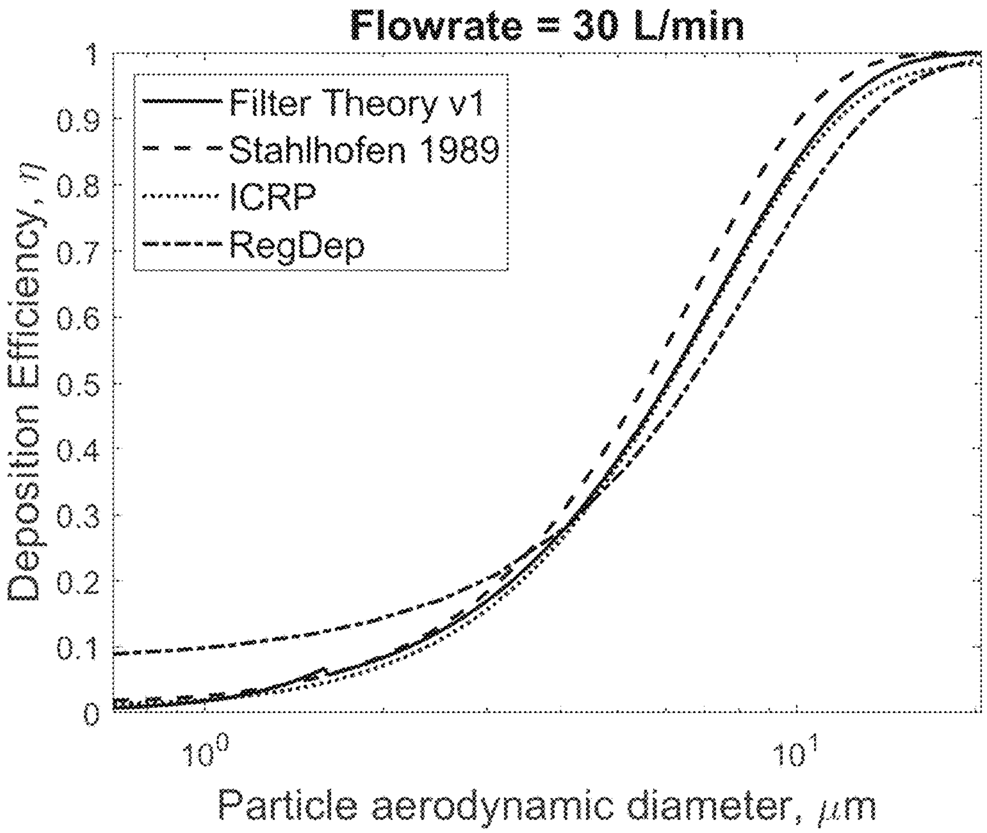
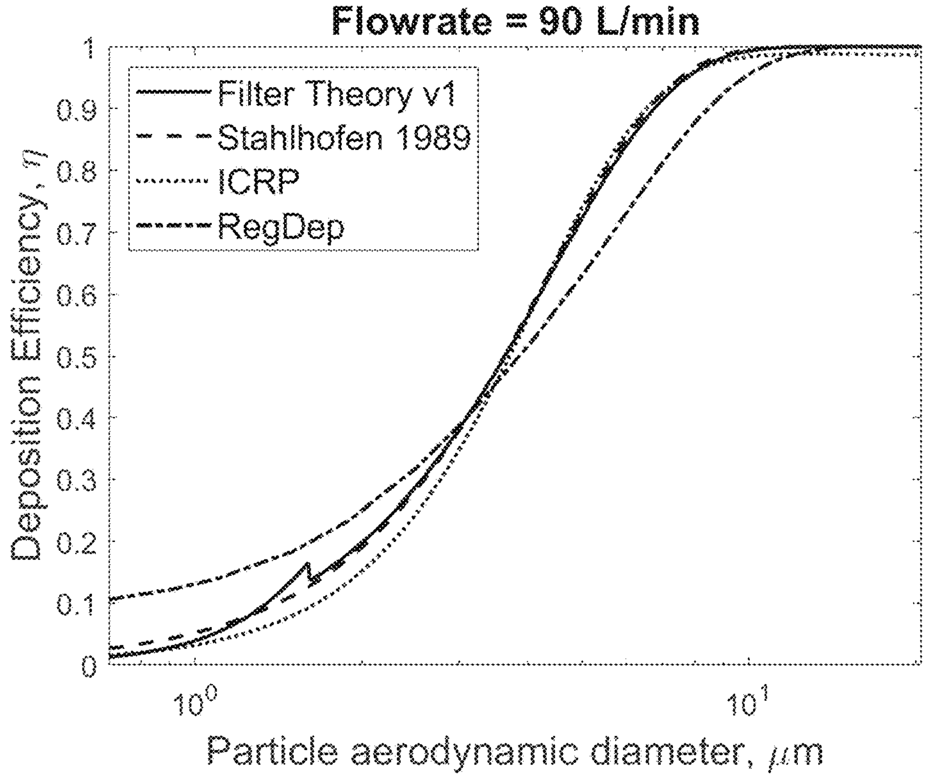
FIG. 3D

FIG. 7A
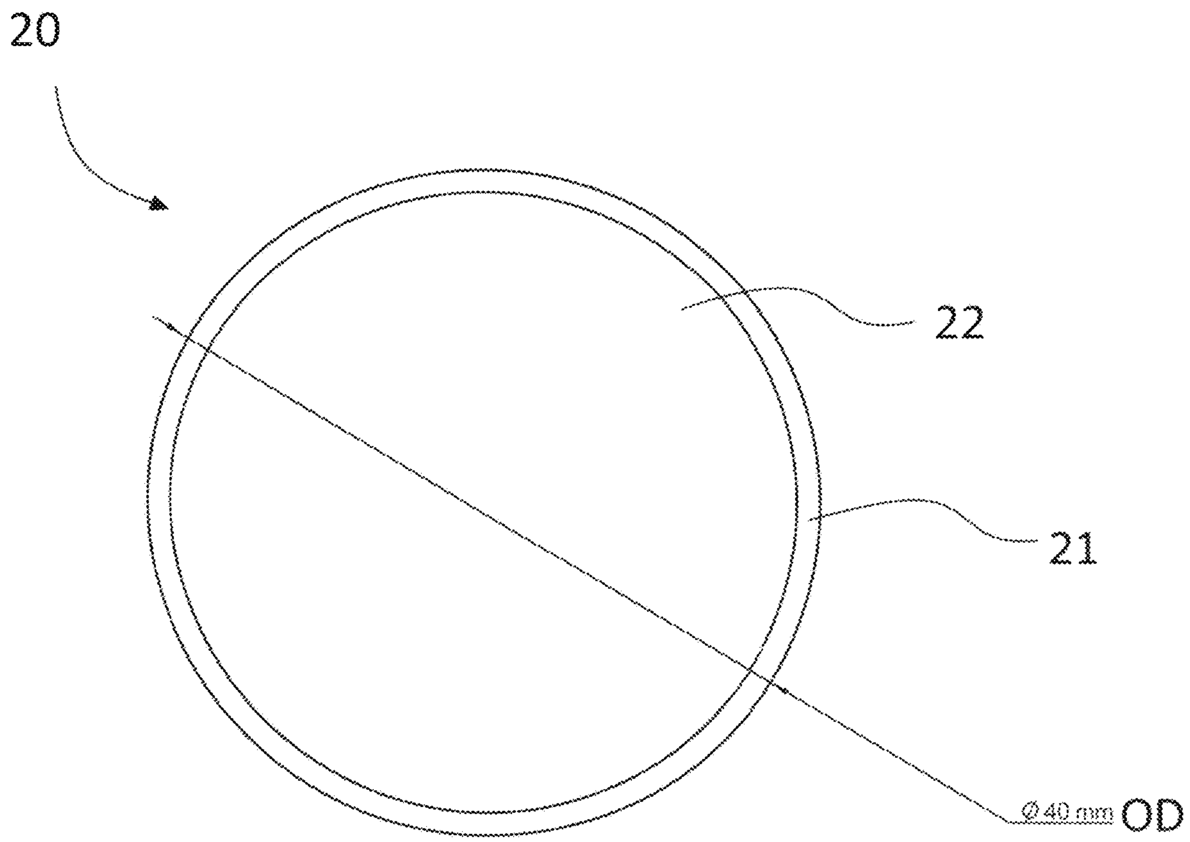
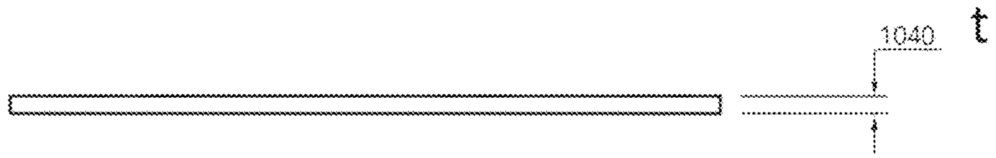
FIG. 7B

FIG. 10A
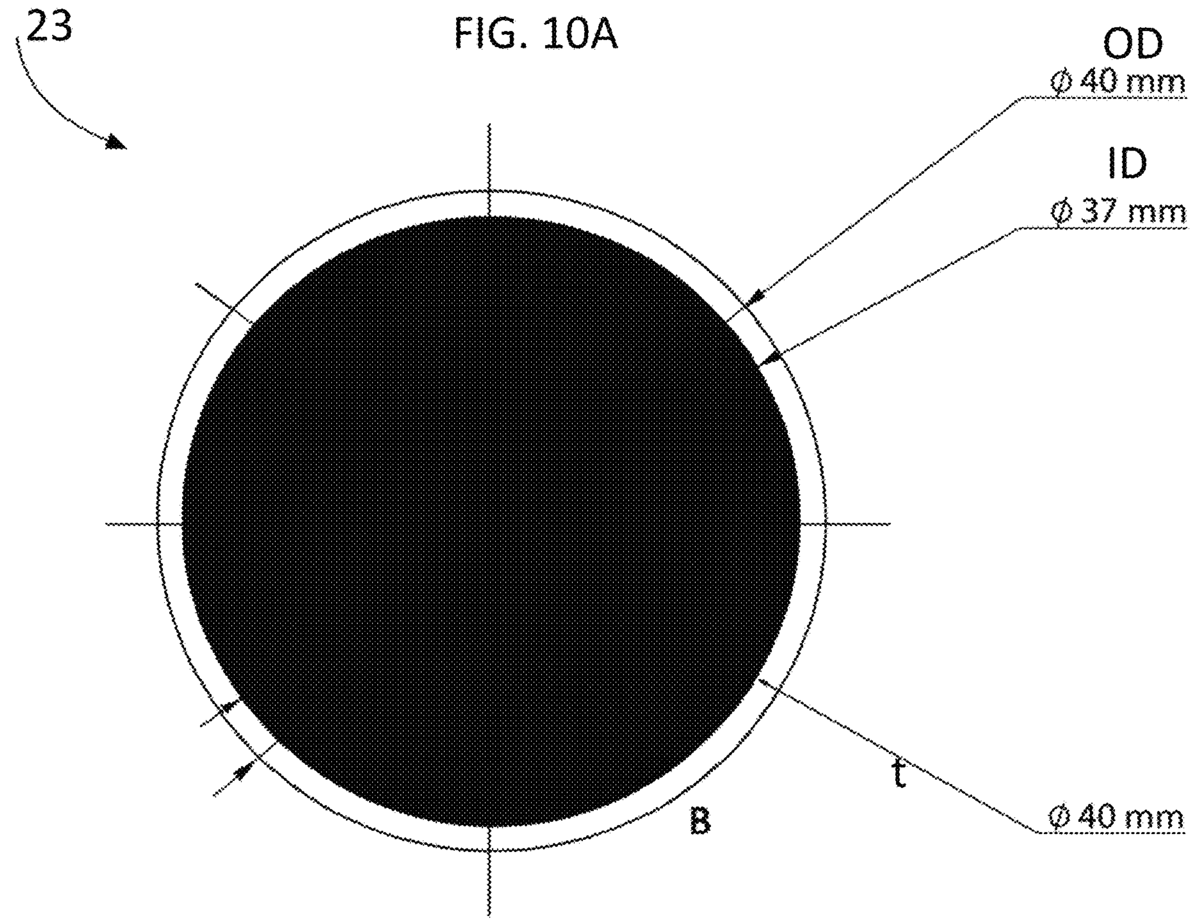
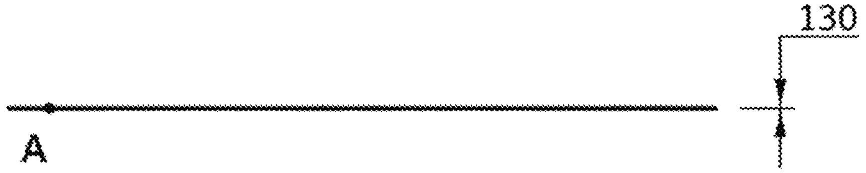
FIG. 10B

DETAIL A
SCALE 300 : 1

INTEGRATED NEUTRALIZER AND ANNULAR FILTER HOUSING FOR A REGIONAL LUNG DEPOSITION FILTER

FIELD

The present invention generally relates to a filter apparatus for aerosol sampling, and more specifically to a specialized filter apparatus that mimics tracheobronchial (TB) deposition of pharmaceutical aerosols emitted by commercially available pharmaceutical inhalers, such as dry powder inhalers (DPIs) having filters to replicate deposition in specific regions of the human respiratory tract over a range of physiologically relevant flowrates.

BACKGROUND

Obtaining in vivo regional deposition measurements of inhaled aerosols directly in identified anatomical structures throughout the lungs remains an elusive goal, in part because it demands spatial and temporal imaging resolution that is beyond current abilities (1,2). Despite these challenges, Usmani et al. (3) demonstrated that targeted regional lung deposition of albuterol in the conducting airways improved therapeutic response relative to a similar dose depositing more deeply in the lung. Conversely, in situations involving occupational exposure to hazardous aerosols, localized deposition may lead to increased severity of adverse outcomes. Indeed, Schlesinger & Lippmann (4) pointed out that areas in the lung predisposed to increased particle deposition are also those areas most likely to see the onset of cancer. These examples highlight the importance of estimating regional deposition in the lungs, be it for optimizing therapeutic outcomes or for toxicology studies related to environmental aerosol exposure.

In the field of aerosol science, in vitro testing involves the use of physical experiments to determine various properties of aerosols. Such methods are commonly used in the early stages of product development for inhaled pharmaceutical aerosols to characterize device performance. Many have argued for improved in vitro methods that can accurately predict device performance in vivo to reduce the costs and complexities related to the drug development process (Byron, et al., 2010). Of specific interest is the prediction of the dose of drug depositing in different regions of the respiratory tract using in vitro methods.

Particle size and inhalation flow rate are the two external variables that most strongly determine the eventual deposition site of the inhaled aerosol particles. During tidal breathing of ambient aerosols at rest, inhalation flow rate is set by metabolic need, so that to assess risks of exposure to atmospheric aerosols the single most important variable is the size distribution of the aerosol. With knowledge of the size distribution of the particles in question, in silico deposition models can be used to predict the average dose that would deposit in the lungs or specific regions therein. Alternatively, a sampling device can be used to provide exposure estimates, assuming particles are captured with the same efficiency that they are expected to deposit in the body. Koehler et al. (5) describe a sampler that uses polyurethane foam as a filter medium to mimic deposition in the respiratory tract (inclusive of the nasal airway) for an average adult under light exercise breathing conditions (6). This sampler was shown to provide a good estimate of the internal dose of metals associated with exposure to welding fumes and is a step forward from common measurement methods that simply provide a measurement of ambient concentrations and particle size (7). This sampler was further developed by Koehler & Volckens (8) to include multiple filtration stages composed of polyurethane foams and nylon screens representative of the three regions of the respiratory tract, i.e., the extrathoracic, tracheobronchial, and alveolar regions.

While these samplers show great promise in their intended field of occupational hygiene, they are not suitable for use with pharmaceutical aerosols primarily because of their use of a constant flow rate that differs from the expected actual inhalation flow maneuver. It is also not expected that these samplers can be scaled and used directly to mimic regional deposition of pharmaceutical aerosols because the sampler is explicitly designed to mimic tidal breathing deposition efficiencies. For tidal breathing it is known that a significant amount of aerosol is exhaled (9), but for most single breath inhalers the exhaled dose is nearly eliminated due to deposition occurring during breath holding. Furthermore, assay of pharmaceutical ingredients may be difficult when using polyurethane and nylon substrates due to solubility of the substrate in solvents used for assay, resulting in interfering signals of dissolved pharmaceutical ingredients and dissolved substrate.

For estimating regional deposition of pharmaceutical aerosols, the inhalation flow rate generated through the device is of critical importance. As for all aerosols, this flow rate plays a major role in determining deposition efficiencies throughout the respiratory tract, but it is also the source of energy for aerosolizing and deagglomerating the powder contained in passive dry powder inhalers (DPIs). This relationship introduces a dependence of inhaler performance on inhalation maneuvers (flow rates vs. time) and further complicates the dependence of regional deposition on inhalation flow rate, necessitating direct testing of these inhalers using the inhalation maneuvers that patients are expected to perform during actual usage.

Current standards related to quality control and regulatory compliance for inhaled pharmaceutical aerosols, such as the standard set up shown in FIG. 1, specify a number of in vitro tests for device performance (USP-NF, 2017), ranging from quantification of device delivered doses to aerodynamic particle size distribution measurements using cascade impactors for solid particles and laser diffraction for liquid particles. Because aerosol particle behavior in the respiratory tract depends heavily on particle size (Finlay, 2001), simple in vitro tests that determine only the emitted dose from a device provide little practical information for predicting regional deposition in the airways.

In vitro quantification and qualification of orally inhaled drug products is extensively used as a measure of quality assurance and quality control (QA/QC); the same methods are also used to inform new product development and demonstrate equivalence of generic alternatives to previously approved products. When using these methods in the latter two capacities, researchers must understand their limitations and implement enhancements to improve the correlation of in vitro results to expected in vivo outcomes.

For QA/QC purposes, delivered dose uniformity (measured with a dose uniformity sampling apparatus) and the aerodynamic particle size distribution (APSD, measured by cascade impaction) can be determined using the methods described in the appropriate pharmacopeia documents [34, 35]. Delivered dose uniformity provides a measure of the entire delivered dose of active pharmaceutical ingredient (API) while the APSD relates to the anticipated in vivo deposition profile. However, the simplifications that make cascade impactor methods standardized, repeatable, and simple preclude meaningful estimation of the deposition site of the emitted API. In particular, the use of a highly simplified induction port results in coarse particles being characterized by the impactor. This problem is partially addressed by the determination of the fine particle fraction (FPF), which is generally defined as the fraction of the delivered dose with an aerodynamic diameter less than 5 μm. While this size is explicitly defined by the European Pharmacopeia [34], the United States Pharmacopeia allows the specific size to be defined by the individual product monograph; this combined with users making the convenient choice of using a specific impactor stage to define the FPF (thereby eliminating the need to interpolate between stages) results in FPF upper size limits ranging in the literature between 4.5 and 6.8 μm [36]. Also referred to as the respirable dose, the FPF is sometimes considered to be commensurate with the lung dose, but the deposition site (extrathoracic vs. lung) of particles around the FPF limit will depend strongly on the kinetics of the inhaler and the inhalation maneuver of the patient. Finally, the FPF alone omits any measure of the width (or geometric standard deviation [GSD]) of the particle size distribution; two aerosol clouds could have an identical FPF yet significantly different widths, resulting in differing deposition patterns for the two aerosol clouds in vivo [36].

Currently, the preferred experimental setup designed to provide quantitative in vitro predictions of inhaler performance involves placing a cascade impactor downstream of an extrathoracic airway model; if the extrathoracic airway model accurately mimics extrathoracic deposition, then the aerosol classified by the impactor represents the total lung dose and can be divided into regional deposition estimates by applying in silico deposition models (10). While in theory, this methodology can generate helpful insights into inhaler performance, it has many disadvantages. First, cascade impactors must operate at a constant flow, which makes testing inhalers with realistic breath profiles more complicated. While this problem can be overcome in large part by using mixing inlets and providing a bias flow to the impactor in order to generate time-varying flow through the inhaler (11-13), upper limits on inhalation flow rates are still imposed. More important is the issue of the resources required to perform cascade impactor experiments. If an experimenter is using the Next Generation Impactor (NGI), the aerosol is classified into seven size stages (eight if the pre-separator is used); each stage must be collected and assayed individually to determine the mass of aerosol in each size bin. If regional deposition estimates are desired, this size distribution data must then be coupled with a regional deposition model calculation before a final result can be reached. This procedure is so involved that a well trained laboratory analyst can only complete 1-2 cascade impactor measurements in a single work day, which precludes high volume testing.

The determination of aerodynamic particle size distributions using cascade impactors is standard practice (Hickey, 2004). Various cascade impactor designs have been described in the literature (U.S. Pat. No. 3,795,135, 1974; U.S. Pat. No. 5,343,767, 1994; U.S. Pat. No. 6,453,758 B1, 2002). Common limitations among existing designs of cascade impactors are inter-stage losses, costs associated with operator time and solvent usage, and the requirement for operation at a constant flowrate (precluding the use of realistic inhalation patterns). Methods have been proposed to utilize mixing inlets such that a realistic inhalation profile can be delivered through an inhaler upstream of a cascade impactor while still satisfying the requirement for a constant flowrate in the impactor itself. The introduction of a mixing inlet, however, may lead to increased losses and significantly complicates experimental testing procedures. Standard practice involves the definition of a fine particle dose (or fine particle fraction), representing the portion of particles in an aerosol with a diameter below a specified limit (delineating fine and coarse particles) based on measured aerodynamic particle size distributions. Fine particles are often thought of having a size allowing for penetration and deposition in the airways. However, as particle deposition depends on flowrate as well as particle size, this treatment masks the effects that changing flowrates over the course of an inhalation can have on respiratory tract deposition, and there is no consensus on the appropriate size range for such fine particles (Clark & Borgstrom, 2002).

Flowrate effects on regional lung deposition can be captured using mathematical models of deposition in the respiratory tract. One-dimensional lung deposition models using particle size and inhalation flowrate as input parameters have been developed to predict regional deposition (ICRP, 1994), and can be used in conjunction with cascade impactor measurements to predict respiratory tract deposition. However, the correlations used in mathematical models are valid only for a specified range of parameters, and most existing models prove inadequate in predicting extrathoracic deposition a priori. Fortunately, accurate measures of extrathoracic deposition can be obtained using in vitro models of the mouth-throat (e.g. the Alberta Idealized Throat, Copley Scientific). The combination of realistic mouth-throat models placed upstream of cascade impactors may provide a method for estimating regional deposition, but is still subject to the limitations associated with cascade impactor measurements and the incorporation of time-variant inhalations.

The first and simplest step in improving the pharmacopeial methods is to use an induction port that mimics extrathoracic deposition in the human population [36, 37] such as the Alberta Idealized Throat (AIT). When such an induction port is used, the dose depositing in the cascade impactor is representative of the expected lung dose and can be characterized by its MMAD and GSD, allowing further analysis using advanced in silico methods to predict regional deposition of this dose within the lung [10]. Others [38, 39] have proposed using impactors with fewer stages, called fast screening impactors (FSI), for abbreviated impactor measurements (AIM) to fractionate this in vitro lung dose directly into FPF and extra-fine particle fractions to reduce the resource burden associated with full resolution impactor measurements. These fractions cannot be directly associated with in vivo deposition in regions of the lungs since deposition site/proportions will depend on the inhalation profile generated by the patient. Further, this approach prohibits accurate estimation of regional lung deposition because the resolution of the distribution is lost.

An additional step in improving the pharmacopeial methods involves generating realistic inhalation patterns through the inhaler and extrathoracic model. This is most important for dry powder inhalers, where the inhalation provides the energy source for aerosolization and deagglomeration of the powder, but is also useful for testing delayed inhalation with pressurized metered dose inhalers (pMDIs) and soft mist inhalers (SMIs) for which poor patient coordination could reduce device performance. Cascade impactors, however, must be operated at specified, fixed flow rates for which they are calibrated. Additional equipment (mixing inlet, makeup flow supply line with flow monitoring, and breath generator) can be incorporated into the cascade impactor apparatus to enable time varying inhalations to be performed through the inhaler while the cascade impactor remains under constant flow [40, 12]. This is a significantly more complicated experiment to conduct and also sets an upper limit on flow rate, imposed by the maximum flow rate for which the cascade impactor has been calibrated.

Filters provide an alternative method for classifying aerosol particles. The theory of operation for aerosol filters is described in the literature (Davies, 1973). Filters are typically designed to clean an airstream by removing as many particles as possible. For such filters, the filtering efficiency is ideally 100% for all particles, though in practice there is a most-penetrating particle size for which the filter efficiency is a minimum.

Polyurethane foam filters have been used to characterize ambient aerosols (Brown, 1980; Kuo, et al., 2005; Koehler & Volckens, 2013; Sleeth, Balthaser, Collingwood, & Larson, 2016; Tomyn, Sleeth, Thiese, & Larson, 2016; Courbon, Wrobel, & Fabries, 1988; Chung, Aitken, & Bradley, 1997; Vincent, Aitken, & Mark, 1993; Chen, Lai, Shih, & Yeh, 1998). Empirical models describing the penetration of particles through such filters are available and known in the art (Clark, Koehler, & Volckens, 2009). Such models have been used in the development of ambient aerosol samplers that attempt to replicate respiratory tract deposition based on the various deposition models. The state of the art involves the replication of ICRP (ICRP, 1994) deposition efficiency curves for extrathoracic, tracheobronchial, and alveolar deposition (Koehler & Volckens, 2013). The current art advocates the use of constant flowrates, precluding the use of time variant inhalation profiles, and relies on mathematical models to model extrathoracic deposition efficiency curves. These limitations prevent the use of such filters in characterizing therapeutic aerosols delivered from inhalation devices, as time-variant inhalation profiles and complicated deposition behavior in the extrathoracic region are observed when using such devices.

Recently, Tavernini et al. (14) presented a filter that could be used to provide regional deposition estimates without the use of cascade impactor measurements. This filter was shown to have a filtration efficiency similar to predicted tracheobronchial (TB) deposition for a wide range of particle sizes and flow rates. The authors suggest the filter can be used downstream of an extrathoracic airway model and upstream of an absolute filter, the latter collecting any aerosol passing through the TB filter. The two filters separately capture the expected tracheobronchial and alveolar dose (assuming that there is no exhaled dose). It was not shown whether this filter functions as intended with pharmaceutical powder aerosols, since Tavernini et al. examined only the filtration efficiency of their TB filter sampling from a chamber containing laboratory-generated oil aerosol.

For DPI aerosols, a complicating issue is the electrostatic charge state of the particles exposed to the TB filter. It is known that particles emitted from DPIs can carry considerable bipolar charge (15). Charged particles were not considered in the development of the Tavernini et al. (14) TB filter. Traditional methods for evaluating inhaler performance also do not take particle charge into consideration, and the effect that aerosol charge has on deposition in the lungs remains an area of study. Majid et al. (16) implemented electrostatic deposition in a stochastic lung deposition model and found TB deposition was enhanced by approximately 10% for one-micron and sub-micron sized particles inhaled at 30 L/min, while enhancement in the alveolar region was approximately 20%. The authors also compared deposition calculated at 18 and 50 L/min and found that at higher flow rates the enhancement was reduced in the TB region but increased in the alveolar region. Flow rates generated with the use of single breath inhalers are often higher than the authors studied, indicating TB deposition enhancement may be insignificant for those applications. Similar results were reported by Koullapis et al. (17), who employed computational fluid and particle dynamics to investigate the effects of particle charge on deposition in a realistic geometry of the human respiratory tract inclusive of the mouth-throat to the seventh generation of the lungs. At a flow rate of 60 L/min (the highest investigated in that study) deposition in the domain was nearly independent of particle charge for 2.5 μm particles and increased from about 20% to 30% for 1 μm particles. The authors show that for a flow rate of 15 L/min the deposition enhancement occurs primarily in the extrathoracic region, but they do not specify if this is the case at higher flow rates. Nevertheless, these two studies show that for pharmaceutically relevant particle sizes and inhalation flow rates, deposition in the tracheobronchial airways is largely independent of particle charge for charge levels and flow rates expected with pharmaceutical aerosols.

By contrast, particle charge could have major effects on the filtration efficiency of the Tavernini et al. (14) TB filter, since it is comprised of two layers of stainless-steel mesh. The square pores of the steel mesh are ~30 μm wide, so that particles passing through the filter come into close proximity to the filter fibers. These distances are an order of magnitude smaller than even the final generation of the alveolar region, while the tracheobronchial region terminates with bronchioles approximately 600 μm in diameter (18). Since the fibers of the Tavernini et al. (14) TB filter are electrical conductors, image charges will readily form in the presence of a nearby charged particle, causing large electrostatic forces and thus higher filtration efficiency. While particle charge may not have a significant effect in the tracheobronchial region of the lungs in vivo, it may cause significant departure from the designed filtration efficiency of the Tavernini et al. idealized TB filter. This issue could be resolved by neutralizing the aerosol before exposing it to the TB filter.

Accordingly, there remains a need in the art for a filter apparatus that mimics tracheobronchial (TB) deposition of pharmaceutical aerosols emitted by commercially available pharmaceutical inhalers, of which, dry powder inhalers (DPIs) and pMDIs are subtypes to provide an in vitro method to rapidly evaluate regional lung doses delivered by pharmaceutical inhalers directly using variable inhalation profiles without any additional equipment or changes to the experimental configuration. There additionally remains a need for the ability of such a filter-based apparatus (FBA) to provide regional deposition estimates in agreement with an in silico model that uses the results of traditional cascade impactor measurements as input to generate regional lung deposition estimates for a selection of pMDI devices.

SUMMARY

The present invention provides a regional lung deposition system including a throat simulation device, an electrostatic neutralizer, and a first filter positioned within a first filter housing. The electrostatic neutralizer is positioned downstream of an in fluid communication with the throat simulation device. The filter housing is positioned downstream of and in fluid communication with the electrostatic neutralizer. The first filter that is positioned within the filter housing is downstream of the throat simulation device and the electrostatic neutralizer. The regional lung deposition system mimics tracheobronchial (TB) deposition of pharmaceutical aerosols emitted by commercially available pharmaceutical inhalers to provide an in vitro method to rapidly evaluate regional lung doses delivered by pharmaceutical inhalers directly using variable inhalation profiles. The present invention additionally provides a method of providing regional deposition estimates in agreement with an in silico model that uses the results of traditional cascade impactor measurements as input to generate regional lung deposition estimates for a selection of pharmaceutical inhalers.

BRIEF DESCRIPTION OF THE DRAWINGS

The present invention is further detailed with respect to the following drawings that are intended to show certain aspects of the present of invention, but should not be construed as limit on the practice of the invention, wherein:

FIGS. 3A-3D are graphs showing deposition in the trachea-bronchial region (red lines are from a correlation based on in vivo data, yellow and purple lines are average predicted values from mathematical models) compared with predicted deposition with a filter having fiber diameter 4 micrometers, 99.9% void fraction, thickness of 1 mm, and an area of 10.8 $cm^2$ (blue line);

FIG. 7A is a top view of the filter of FIG. 6;

FIG. 7B is a side view of the filter of FIG. 6;

FIG. 10A is a top view of the filter layer of FIG. 9;

FIG. 10B is a side view of the filter layer of FIG. 9;

DETAILED DESCRIPTION

Figure 1:
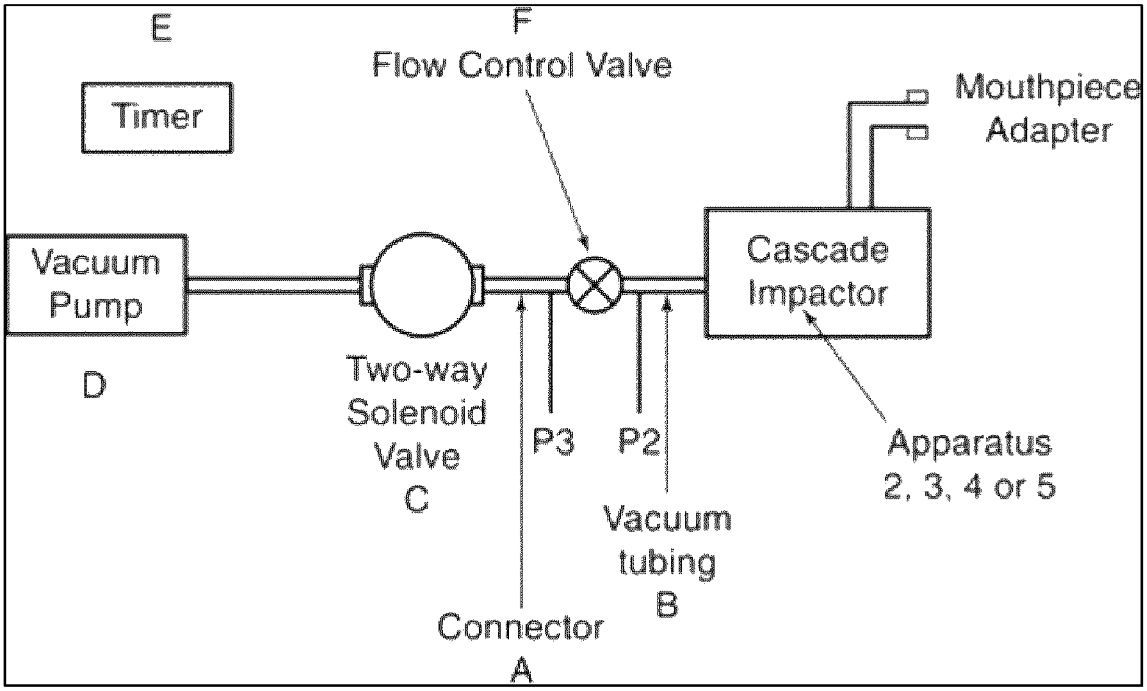
FIG. 1 is a sketch showing the standard setup used for cascade impactor measurements of inhalation products according to standard (USP-NF, 2017)

The present invention has utility as a filter apparatus that mimics tracheobronchial (TB) deposition of pharmaceutical aerosols emitted by commercially available dry powder inhalers (DPIs) to provide an in vitro method to rapidly evaluate regional lung doses delivered by pharmaceutical inhalers directly using variable inhalation profiles without any additional equipment or changes to the experimental configuration. The present invention additionally has utility as a method for using such a filter-based apparatus (FBA) to provide regional deposition estimates in agreement with an in silico model that uses the results of traditional cascade impactor measurements as input to generate regional lung deposition estimates for a selection of pharmaceutical inhalers.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

According to embodiments, the inventive regional lung deposition system 50 that mimics tracheobronchial (TB) deposition of pharmaceutical aerosols includes an Alberta Idealized Throat 40, an electrostatic neutralizer 52, and a filter housing 51 having a filter 20 that mimics TB deposition. The inventive system 50 is able to fractionate in vitro lung dose into tracheobronchial and alveolar regional deposition estimates for dry powder inhaler aerosols to provide an in vitro method to rapidly evaluate regional lung doses delivered by pharmaceutical inhalers directly using variable inhalation profiles.

Electrostatic Neutralizer

A custom bipolar ion source 52 is designed to allow neutralization of inhaled pharmaceutical aerosol formulations prior to their passage through a filter 20 that mimics TB deposition. Since the intent of the present TB filter device 50 is to enable direct testing of inhalers with physiologically realistic inhalation profiles, the ion source 52 must be integrated into the TB filter apparatus 50 to rapidly neutralize aerosol after it exits the extrathoracic airway model before traversing the TB filter media 20. The internal volume is minimized so that the aerosol emitted by the inhaler is exposed to the TB filter 20 at an appropriate time in the breath inhalation maneuver.

An estimate for the maximum required ion concentration can be made by considering one of the most highly charged dry powder inhalers, the Pulmicort Turbuhaler (15). A total charge is assigned to each bin of the particle size distribution reported by Ruzycki et al. (10) by multiplying mass by charge-to-mass ratios reported by Yu et al. (15). The number of ions needed to neutralize the aerosol can then be determined by summing the total charge and dividing by the elementary charge. While Ruzycki et al. reported mass as a function of particle size for five actuations of a 200 μg per dose budesonide Turbuhaler, the present invention does not divide the number of ions by five in order to extrapolate a worst case ion requirement. An ion concentration can then be determined by identifying the volume of the aerosol bolus. The emission kinetics of DPIs remains an area of study but depends on the device type, powder formulation, and inhalation maneuver (19). For the fastest emptying device studied by Dorosz et al., the bulk of aerosol appears to be emitted in as little as 0.4 s after only 0.1 s of inhalation, giving an aerosol bolus of about 400 mL for the flow profile used by Ruzycki et al. (10). Assuming that the aerosol is evenly distributed throughout the bolus leads to an estimate for an ion requirement of approximately $1.9\times10^8$ ions/mL to neutralize the aerosol. Note that this value represents only the ions required to neutralize the aerosol. In actuality, an excess of ions is required since neutralization is not expected to be 100% efficient.

The ion requirement found with this approach happens to be very similar to the requirement reported by Hinds & Kennedy (20), who demonstrate that the radioactive source required to provide such an ion concentration is enormous. However, the authors also demonstrate the ability of a custom-made corona discharge ion generator to almost entirely neutralize a unipolarly charged aerosol in their application. Their ion generator employs direct current applied to preferentially sized electrodes in order to generate the desired polarity of corona. For the present application, 60 Hz alternating current (AC) is used to generate both polarities of ions, albeit at opposite phases of each AC cycle rather than simultaneously.

Bearing in mind the above considerations, embodiments of the present disclosure provide a custom ion generator 52 to incorporate into the TB filter housing 51. A simple AC high-voltage source is built using a 10 kV transformer (2721-628G; Allanson International, Markham, Canada) which uses standard 120 V 60 Hz input to excite the secondary coil. Benchtop experimentation leads to an electrode design in which one high-voltage lead 54 is attached to an internally serrated stainless-steel ring 56, with the second high-voltage lead attached to a cylinder centered within the ring 56. Corona discharge is observed to form on each point of the serrated ring 56, emitting ions and creating an annular region of high ion concentration. Passing charged aerosol through this annulus provides the desired neutralization. To do so, however, necessitates redesigning the TB filter housing of Tavernini et al. (14) from a simple conical expansion (shown in FIGS. 4 and 5) to a more complex annular shape. This alteration is acceptable so long as the face velocity of the filter 20 is maintained. The filter face velocity is the lowest velocity region in the experiment, making it also the ideal location to neutralize the aerosol. Changing the filter 20 to an annular shape (while maintaining the face area) allows the annular ion-generating region to be placed directly upstream of the TB filter 20.

This design change is also inspired by the potential for the laryngeal jet (21,22) to persist into the TB filter housing 51 and thereby cause non-uniform face velocity and thus off-spec filtration due to the previously mentioned dependence of filtration efficiency on face velocity. By introducing an abrupt expansion in the filter housing 51, the jet is forced off the anterior wall rather than remaining attached due to the Coanda effect. After rapid expansion from the extrathoracic model outlet, the free jet impinges on the top of the annular core to further distribute the energy of the jet into the bulk flow, allowing relatively uniform flow down the annular gap towards the TB filter. Since the jet impinges on the top of the annular core it is assumed that the largest particles remaining in the flow will be deposited here, so a collection dish is incorporated into the design at this location (herein referred to as the flow disruptor plate).

Figure 12:
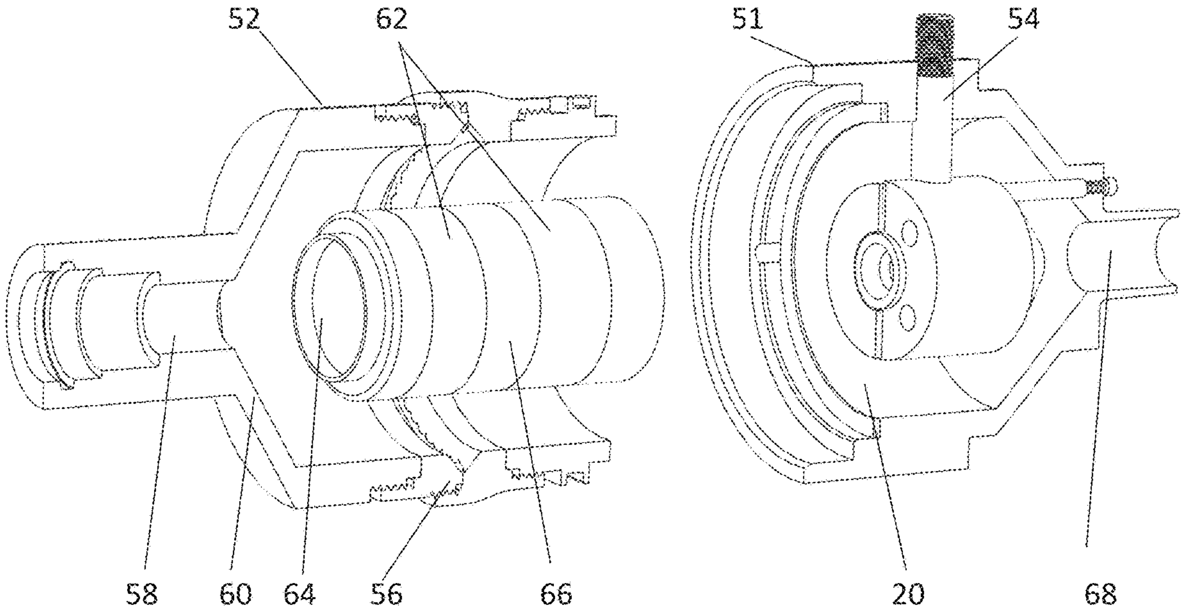
FIG. 12 is an exploded partial section view of an annular electrostatic neutralizer and a TB Filter assembly according to embodiments of the present disclosure.

FIG. 12 shows the details of the TB filter apparatus 50 redesigned to an annular flow channel. The housing includes a centrally located 16 mm-diameter inlet 58 which is the attachment point for the extrathoracic geometry to interface. This small diameter section then expands rapidly at a 60° expansion angle to a diameter of 75 mm. Axially aligned with the inlet 58 is the annulus core 60, the top of which begins approximately 30 mm in the axial direction from the onset of the expansion region of the inlet 58. The annulus core 60 is a 45 mm-diameter cylindrical assembly; the top (flow disruptor) has a collection dish with 5 mm-tall walls and an inner diameter of 33 mm that is electrically grounded through connections inside the core. Teflon parts 62 insulate the flow disruptor plate 64 and the rest of the assembly from the “core electrode” 66, which is electrically connected to a lead extending outside the neutralizer. The core electrode 66 has an axial length of 15 mm and an outer diameter of 45 mm. Across the annular gap, the corona electrode ring 56 is axially centered relative to the core electrode 66; it is made of 0.003" (0.08 mm) thick 304 stainless steel and has 60 round serrations forming sharp points or “teeth” that serve as corona onset locations. These teeth are separated from the core electrode by 17 mm. The TB filter 20 is located 42 mm downstream of the corona electrode ring. Each layer of the TB filter mesh (SV-26/25tw, SV-34/30tw; ASADA MESH Co., Osaka, Japan) is spot-welded between 1 mm-thick stainless steel rings, which supports the filter layers. The annular filtering region has an outer diameter of 75 mm and an inner diameter of 45 mm. These dimensions provide a filtering area equivalent to the previously described (14) 60 mm-diameter disk filters. Upon traversing the TB filter, the fluid region returns at a 45° draft angle to an internal pipe flow with a diameter of 18 mm. This is the exit 68 of the TB filter housing 51 where a final filter can be connected to capture the remaining particles representative of the alveolar dose. The internal dead space from the beginning of the inlet 58 to the TB filter 20 is 310 mL, and the total dead space of the entire housing 51 is 488 mL.

In Vitro Inhaler Performance

Regional deposition estimates of four commercially available DPIs delivering different active pharmaceutical ingredients (APIs) are obtained. Each device differs in either its metering mechanism, use of carrier particles (or not), or resistance to flow through the device. Inhalers tested included Onbrez Breezhaler® (Lot SWN96; Novartis Pharmaceuticals Canada Inc., Dorval, Canada), Flovent Diskus® (Lot W94G; GlaxoSmithKline Inc., Mississauga, Canada), Pulmicort Turbuhaler® (Lot PAVE; AstraZeneca Canada Inc., Mississauga, Canada), and Asmanex Twisthaler® (Lot T032728; Merck Canada Inc., Kirkland, Canada). Details of each device are listed in Table I. Inhalation profiles are different for each device because of differences in device resistance. Delvadia et al. (23) measured in vivo profiles generated through different resistance inhalation flow cells and provided the method for selecting appropriate inhalation profiles for in vitro inhaler performance testing are used herein. The inhaler resistance defines the peak inspiratory flow rate (PIFR). The $50^{th}$ percentile PIFRs are used and expected to be generated after professional instruction (Equation 5 in [23]), except in the case of the Breezhaler®, which by this formula would be tested with a PIFR higher than the maximum allowed when using the NGI. The time at which the PIFR is generated ($t_{PIFR}$) and the total volume inhaled (V) are independent of inhaler resistance and are therefore constant for all devices. Furthermore, $t_{PIFR}$=0.49 s and V=2.7 L is used, which are the $50^{th}$ percentile values for mixed-gender data (23). The shape of the breath profile is similar for all inhalers and is made up of two sinusoidal quarter waves. The first quarter wave is the "ramp up" period where inhalation flow rate quickly accelerates to PIFR. The second quarter wave is the majority of the breath from $t_{PIFR}$ to the end of the breath, $t_{total}$, which is set by the total volume inhaled (Equation 10 in [23]). The unique inhalation parameters for each inhaler are also listed in Table I.

Two different experiments are performed (with n=5 measurements each) for each inhaler with these inhalation profiles. One experiment involves direct measurements of the TB filter device performance downstream of an Alberta Idealized Throat 40. The other involves cascade impactor measurements to characterize the inhaler particle size distribution for use in a regional deposition model (see next section).

Inhaler Specific Regional Deposition Estimates

Figure 2:
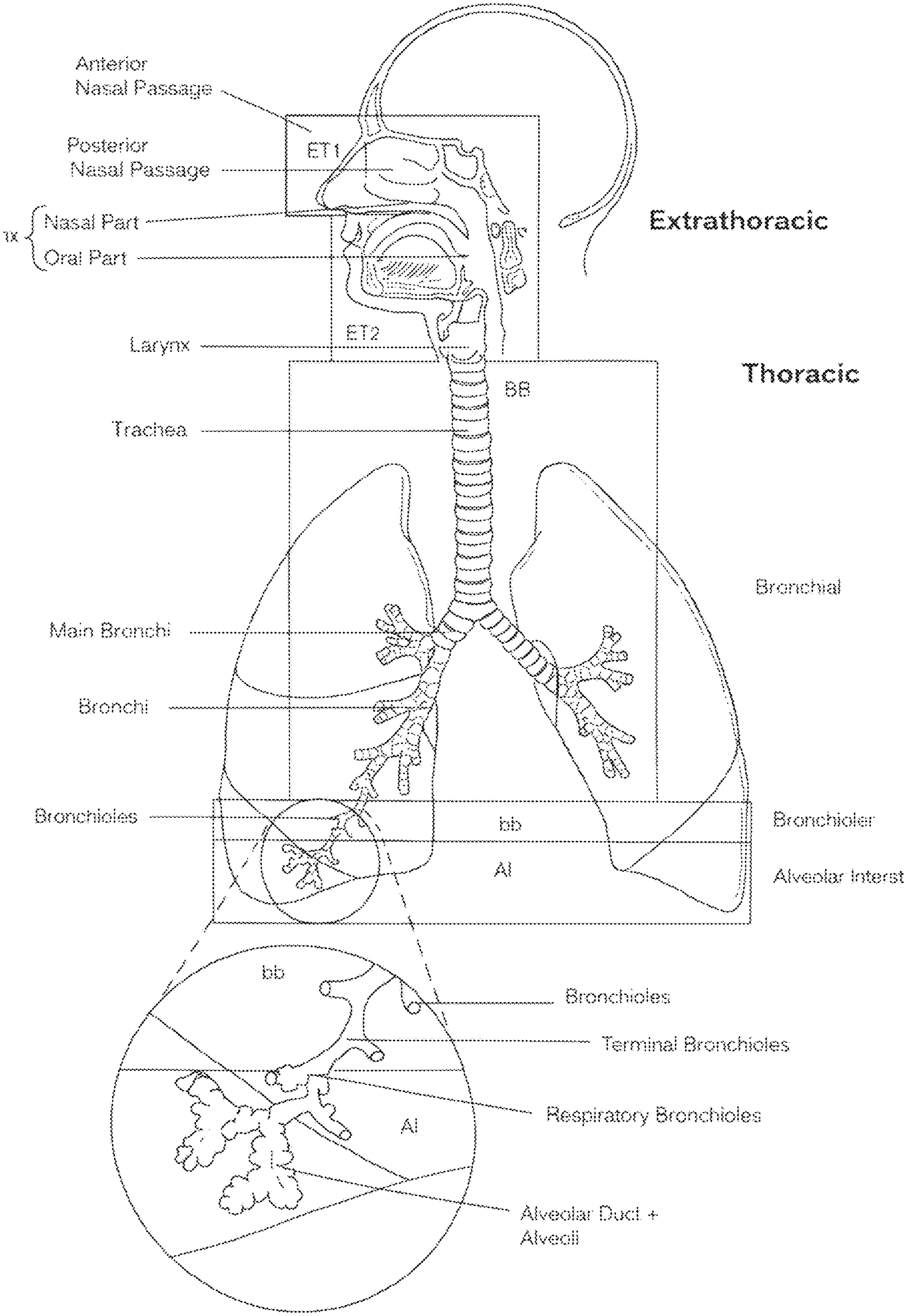
FIG. 2 is a diagram showing the anatomical regions of the human respiratory tract.
Figure 3A:
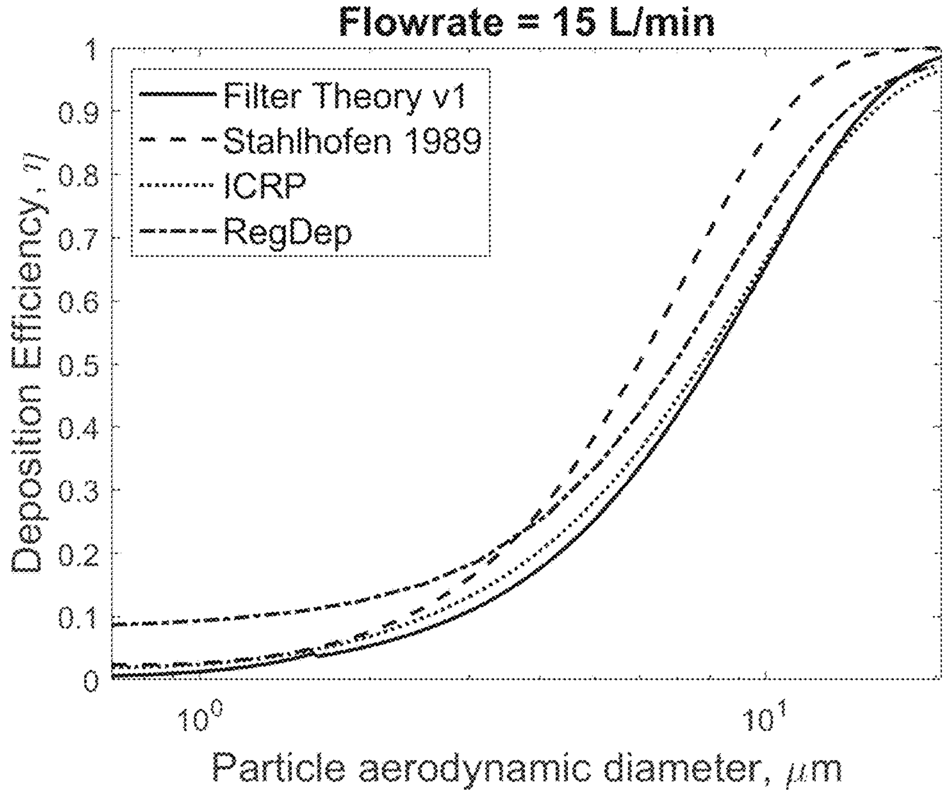
Figure 3B:
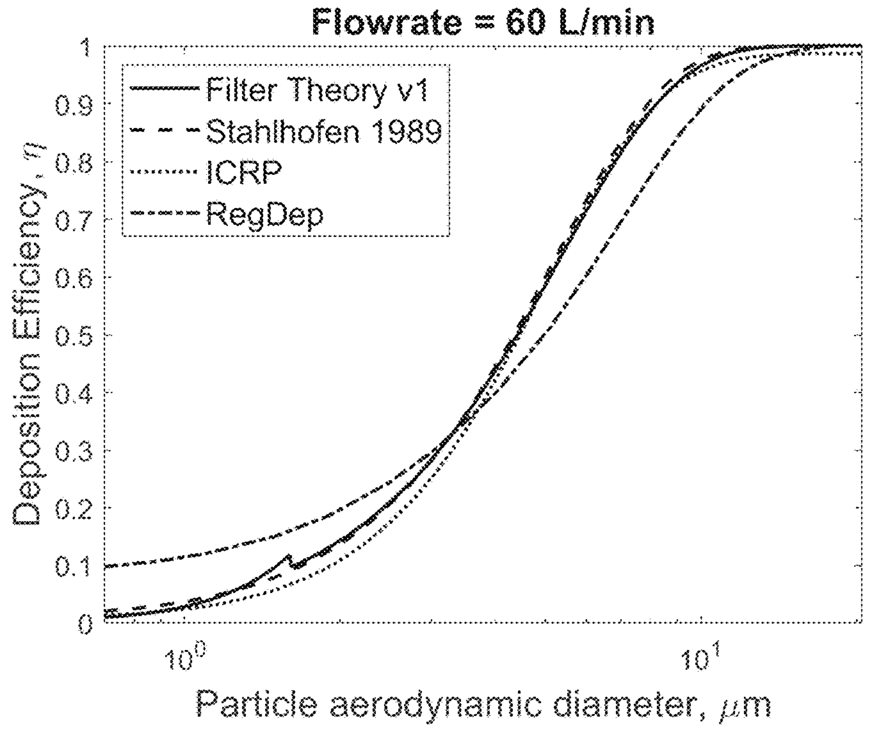

Regional lung deposition estimates for each inhaler are established based on cascade impactor measurements, the results of which are used as input for an in silico regional deposition model. The method used very closely follows the method used by Ruzycki et al. (2020). For the upstream mouth-throat inlet, the Alberta Idealized Throat (AIT) 40 is used. The inhaler being tested is coupled to the inlet of the AIT 40 with a 3D-printed custom adapter unique to that inhaler type, providing an airtight seal and ensuring consistent and proper orientation of the inhaler relative to the AIT 40. A Mixing Inlet (MSP Corporation, Shoreview, MN, USA) downstream of the AIT enables use of time-varying inhalation profiles through the inhaler/extrathoracic model while providing a constant flow of 100 L/min (volumetric) to an NGI with a pre-separator stage (MSP Corporation). An inhalation profile is generated by a custom-built breathing machine that draws from the supply to the mixing inlet. The resulting deficit in makeup air causes the NGI to pull air through the AIT 40 and inhaler. Flow rates are monitored using mass flow meters (4040 and 4043; TSI Incorporated, Shoreview, MN, USA) and the volumetric flow generated through the inhaler is calculated as described by Ruzycki et al. (10) using a LabVIEW program (LabVIEW Professional Development System 2017; National Instruments, Austin, TX, USA). This experimental configuration is demonstrated in FIG. 2*a*.

The cascade impactor data obtained from the above experimental configuration represent the total lung dose, provided that the appropriate fraction of particles is removed in the AIT 40. One mechanism that can cause decreased collection efficiency in the AIT is particle bounce, where a particle which would otherwise be deposited on the extrathoracic airway wall instead rebounds back into the flow. This mechanism artificially inflates the mass of API reaching the lungs but is also difficult to detect. Zhou et al. (24) investigated the difference in particle collection of liquid droplets vs. solid particles with and without coating the walls of extrathoracic models with silicone lubricant fluid. They suggest that for particles <10 μm, bounce should not be a concern when wall coatings are used. However, for particles >10 μm some bounce may occur and is evident by the plateau in deposition observed for polystyrene latex particles around 90% efficiency, which does not occur for oleic acid droplets. While few of these relatively massive particles may bounce through the AIT, they carry significant mass. Conveniently, when using the pre-separator at 100

TABLE I

List of pharmaceutical inhalers studied, physical attributes, and inhalation pattern defining parameters.

| Pharma. Inhaler | API | Doses | Label Claim [μg of API] | Carrier Particles | Metering Mechanism | Device Resistance, R [kPa$^{0.5}$/(L/min)] | PIFR [L/min] | $t_{total}$ [s] |
|---|---|---|---|---|---|---|---|---|
| Onbrez Breezhaler ® | Indacaterol maleate | 30 | 97 | Lactose anhydrous | Capsule | 0.0212 | 100.0 | 2.36 |
| Flovent Diskus ® | Fluticasone propionate | 60 | 250 | Lactose | Blister | 0.0273 | 87.7 | 2.90 |
| Pulmicort Turbuhaler ® | Budesonide | 200 | 200 | None | Hopper | 0.0473 | 59.5 | 4.28 |
| Asmanex Twisthaler ® | Mometasone furoate | 60 | 400 | Lactose monohydrate | Hopper | 0.0302 | 81.3 | 3.13 |

API = Active Pharmaceutical Ingredient,
PIFR = Peak Inspiratory Flow Rate,
$t_{total}$ = breath duration L/min the cut-point is 10 μm, meaning that particles collected in the pre-separator are 10 μm and larger and thus could be those subject to bouncing through the AIT. Therefore, in the present work any mass detected on the pre-separator is added to that collected in the AIT and are referred to as the Upper Respiratory Tract fraction (URT). Thus, only the sized mass collected from the stages of the NGI are considered to contribute to the lung dose in this work.

Regional lung deposition estimates from NGI data are obtained using the regional deposition model presented by Javaheri et al. (25), which uses deposition efficiency equations for inertial impaction (26), sedimentation (27,28), and diffusion (29) to estimate total deposition in each generation of a symmetric lung model (30). In this lung model the trachea is represented by generation 0, the tracheobronchial (or conducting airway) region by generations 0-14, and the alveolar region by generations 15-23. Extrathoracic deposition is not present in the in silico model, since it is already accounted for in the URT deposition noted above. Particle diameters used for evaluating deposition efficiencies are the geometric centers of the stage-bounding 50% collection efficiencies. Particle sizes are assumed to be constant, and hygroscopic effects were neglected. The model uses a constant flow rate to propagate a constant density aerosol through the lung generations; since the aerosol is expected to interact with the TB filter at approximately the PIFR, the breath time in the in silico model is adjusted so that the resulting average flow rate (inhaled volume divided by inhalation time) is equal to the PIFR used for that inhaler. A 10 second breath hold and 7 second exhalation are used for all inhalers (although the latter has little effect on our results since the breath hold reduces the exhaled aerosol to negligible amounts). Total inhaled volume is the same 2.7 L used in the TB filter runs described above. Tracheobronchial deposition is then estimated by summing the calculated particle deposition in generations 0-14. Alveolar deposition is taken to be the total NGI mass less the TB estimate, as this approach best aligns with the experimental method, in which there is no exhaled fraction of aerosol.

These estimates provide target regional lung deposition values for the TB filter device to achieve. Because of variability in the conception of different regional deposition models and inter-subject variability known to exist in vivo, these targets are considered approximate.

Filter

Using equations governing the theory of deposition of particles in filters and the respiratory tract a filter 20 with properties able to mimic deposition in different regions of the respiratory tract is provided. According to embodiments of the present disclosure, the inventive filters 20 mimic deposition in different regions of the human respiratory tract over the wide range of flow rates, such as those seen during inhalation from an inhaler, where the flow rate starts at zero, reaches a maximum and then decreases until inhalation stops at the end of a breath. Filters 20 of the present disclosure approximately match curves of in vivo trachea-bronchial deposition versus particle size for the range of typical flow rates expected in vivo, as seen in FIGS. 3A-3D.

Figure 6:
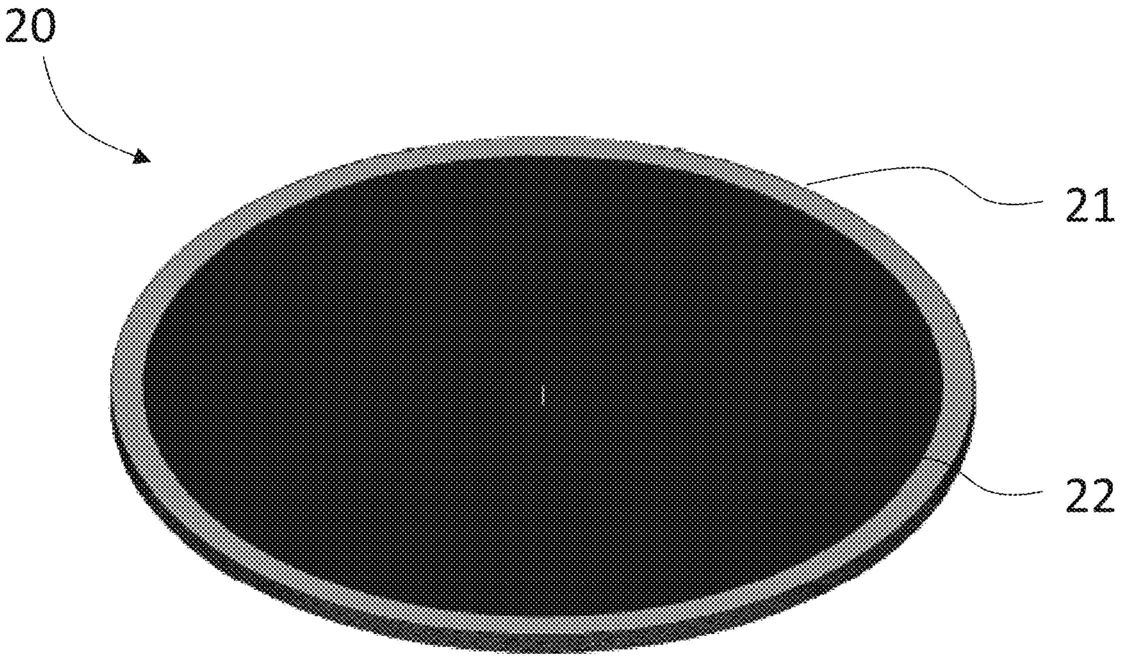
FIG. 6 is a perspective view of a filter according to a form of the present disclosure.
Figure 8:
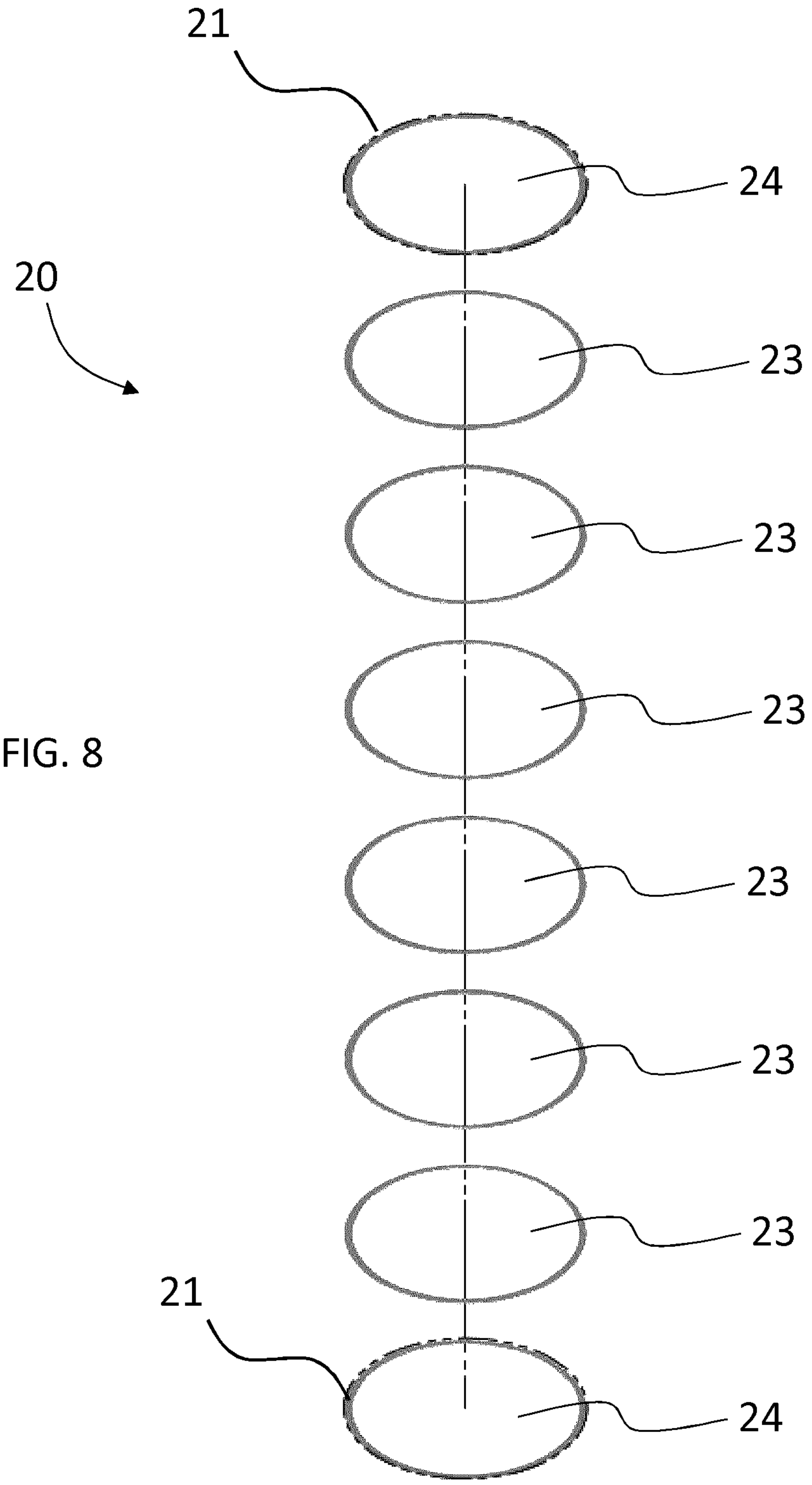
FIG. 8 is an exploded perspective view showing filter layers of the filter of FIG. 6.
Figure 9:
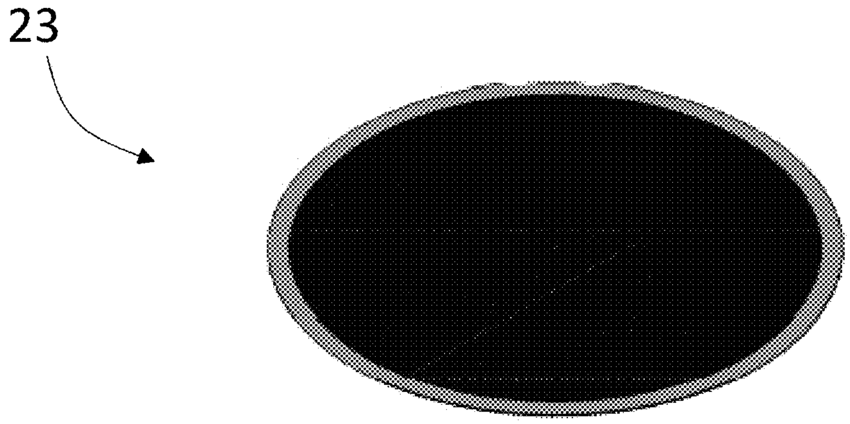
FIG. 9 is a perspective view of a filter layer according to a form of the present disclosure.
Figure 11A:
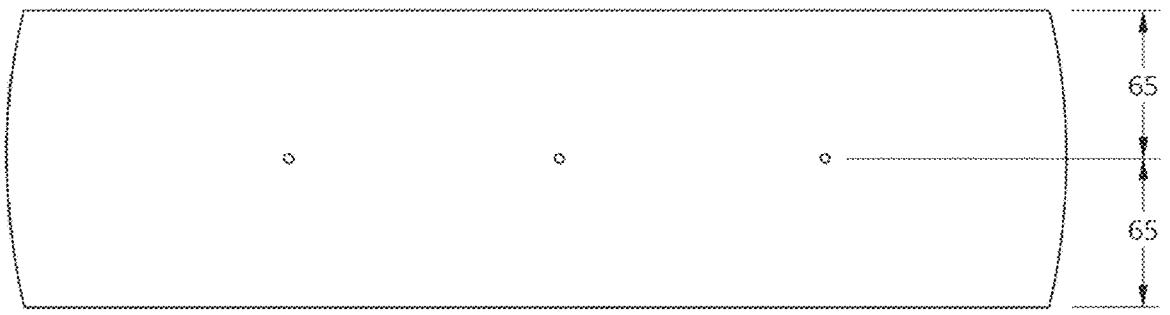
FIG. 11A is a side detail view of the filter layer of FIG. 9.
Figure 11B:
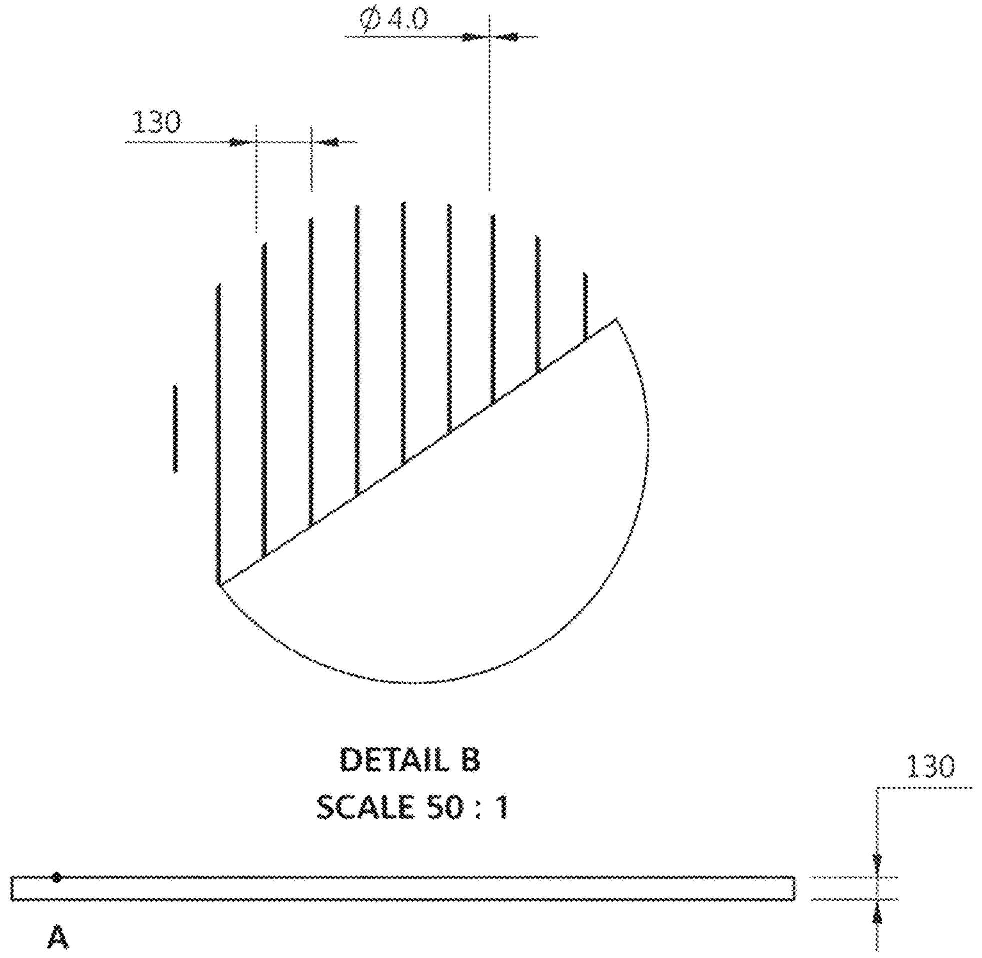
FIG. 11B is a top detail view of the filter layer of FIG. 9.

Filters 20 according to the present disclosure, such as that shown in FIG. 6, are designed based on various deposition mechanisms included in the calculation of filtration efficiency, including impaction, diffusion, gravitational deposition, and interception. As shown in FIG. 6, the filter 20 includes an outer ring portion 21 and a fibrous portion 22. As best shown in FIGS. 7A and 7B, the filter 20 has an outer diameter OD, measuring from the outer edges of the outer ring portion 21. The filter 20 of FIG. 7A has an outer diameter of 40 mm, however, it will be understood that the diameter of the filter 20 may vary based on design parameters for a given test system. As shown in FIG. 7B, the filter 20 also has a thickness T. The outer ring portion 21 and the fibrous portion 22 may be differing thicknesses. As shown in FIG. 8, the thickness of the filter 20 is made up of a plurality of filter layers 23. According to some embodiments, the top and bottom filter layers 24, that is the outer most filter layers of the filter 20, include the outer ring portion 21. These outer ring portions 21 are formed of plastic of metal materials. The outer ring portions 21 of the filter layers 23 snap together or may be joined together to hold the plurality of filter layers 23 in a staked relationship to form the filter 20. FIG. 9 shows a filter layer 23. FIGS. 10A and 10B show further details of a filter layer 23 including an outer diameter OD, inner diameter ID measured from the outer edges of the fibrous portion 22, and a thickness t. The thickness t of the filter layer 23 is smaller than the thickness T of the filter 20.

Important filter properties for fibrous filters include the volume fraction of fibers α, the fiber diameter $d_f$, the filter thickness t, and the single fiber deposition efficiency $E_\Sigma$. $E_\rho$ represents a deposition fraction per unit length of fiber and is a function of multiple mechanisms. The efficiency of a fibrous filter, E, can be calculated according to Equation 1, given knowledge of the above parameters.

$$E = 1 - \exp\left(\frac{-4\alpha E_\Sigma t}{\pi d_f}\right) \quad \text{Equation 1}$$

The focus of single-fiber theory involves characterizing the single-fiber deposition efficiency $E_\Sigma$. Various expressions are available in the literature for a number of mechanisms, the most commonly used of which are summarized by Hinds (1999).

Deposition due to impaction $E_I$, caused by the inertia of a particle leading to deviation from fluid streamlines near the fiber surface, is given as a function of particle Stokes number Stk, the Kuwabara hydrodynamic factor Ku, and a factor/accounting for filter properties, as calculated by Equation 2.

$$E_I = \frac{(Stk)J}{2Ku^2} \quad \text{Equation 2}$$

The particle Stokes number (Stk) can be expressed in terms of the particle relaxation time t, the face velocity $U_0$, and the fiber diameter, as calculated by Equation 3.

$$Stk = \frac{\tau U_0}{d_f} \quad \text{Equation 3}$$

The Kuwabara hydrodynamic factor is a function of fiber volume fraction, as calculated by Equation 4.

$$Ku = -\frac{\ln\alpha}{2} - \frac{3}{4} + \alpha - \frac{\alpha^2}{4} \quad \text{Equation 4}$$

The factor J is a function of the ratio of particle diameter to fiber diameter R and the fiber volume fraction, as calculated by Equation 5.

$$J = (29.6 - 28\alpha^{0.62})R = 27{,}5R^{2.8} \quad \text{Equation 5}$$

This expression is valid for R<0.4. An approximate value of J=2.0 is be used when R exceeds this value.

Interception occurs when a particle following a streamline comes close enough to a fiber such that the particle's radius causes it to deposit. As such, it is a consequence of the finite size of particles. Deposition due to interception $E_R$ can be estimated according to Equation 6.

$$E_R = \frac{(1-\alpha)R^2}{Ku(1+R)} \quad \text{Equation 6}$$

Deposition due to diffusion ED occurs when small particles collide with filter fibers through stochastic random motion. Deposition due to diffusion ED is calculated according to Equation 7.

$$E_D = 2Pe^{-2/3} \quad \text{Equation 7}$$

Pe is the Peclet number, whose value depends on the particle diffusion coefficient D and is calculated according to Equation 8:

$$Pe = \frac{d_f U_0}{D} \quad \text{Equation 8}$$

An additional deposition mechanism accounts for the interception of diffusing particles and is calculated according to Equation 9.

$$E_{DR} = \frac{1.24R^{2/3}}{(Ku\ Pe)^{1/2}} \quad \text{Equation 9}$$

Deposition due to gravitational settling $E_G$ depends on the orientation of the airflow relative to gravity. In situations in which the flow velocity and the settling velocity are in the same direction, $E_G$ is expressed according to Equation 10.

$$E_G = G(1+R) \quad \text{Equation 10}$$

Here, G is the ratio of settling velocity to face velocity according to Equation 11.

$$G = \frac{V_{TS}}{U_0} \quad \text{Equation 11}$$

The overall filtration efficiency $E_\Sigma$ can be approximated by a summation of the above mechanisms according to Equation 12.

$$E_\Sigma = E_I + E_R + E_D + E_{DR} + E_G \quad \text{Equation 12}$$

Control of fiber diameter, face velocity, filter thickness, and fiber volume fraction allow for the design of filters that replicate deposition in various regions of the respiratory tract.

Figure 4:
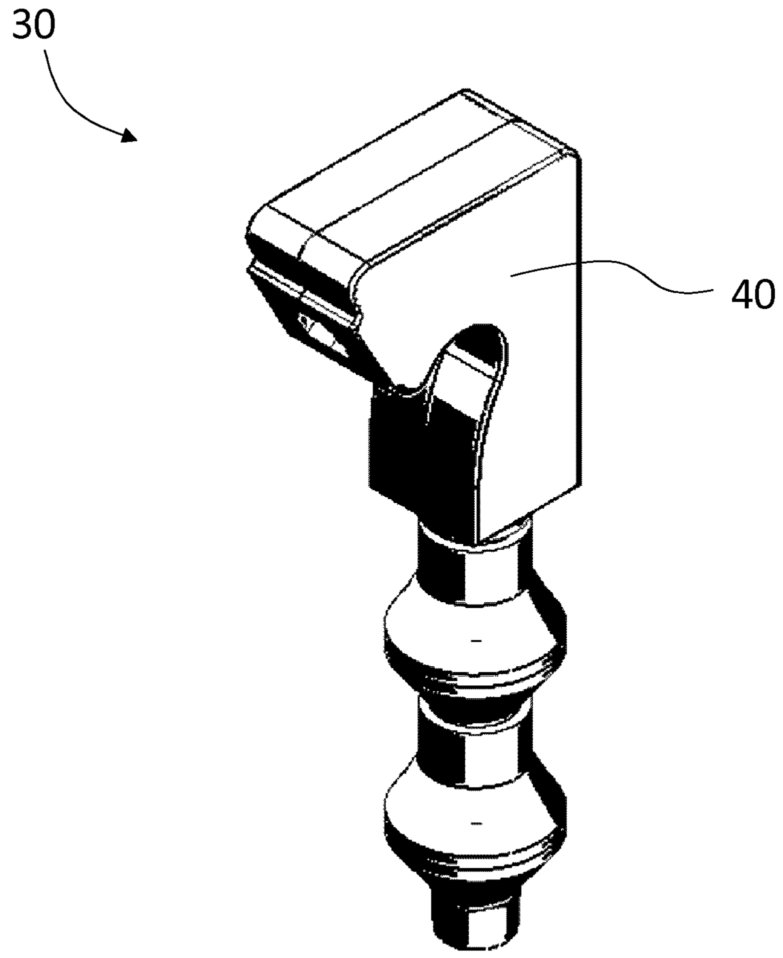
FIG. 4 is a perspective view of a regional lung deposition system according to a form of the present disclosure.
Figure 5:
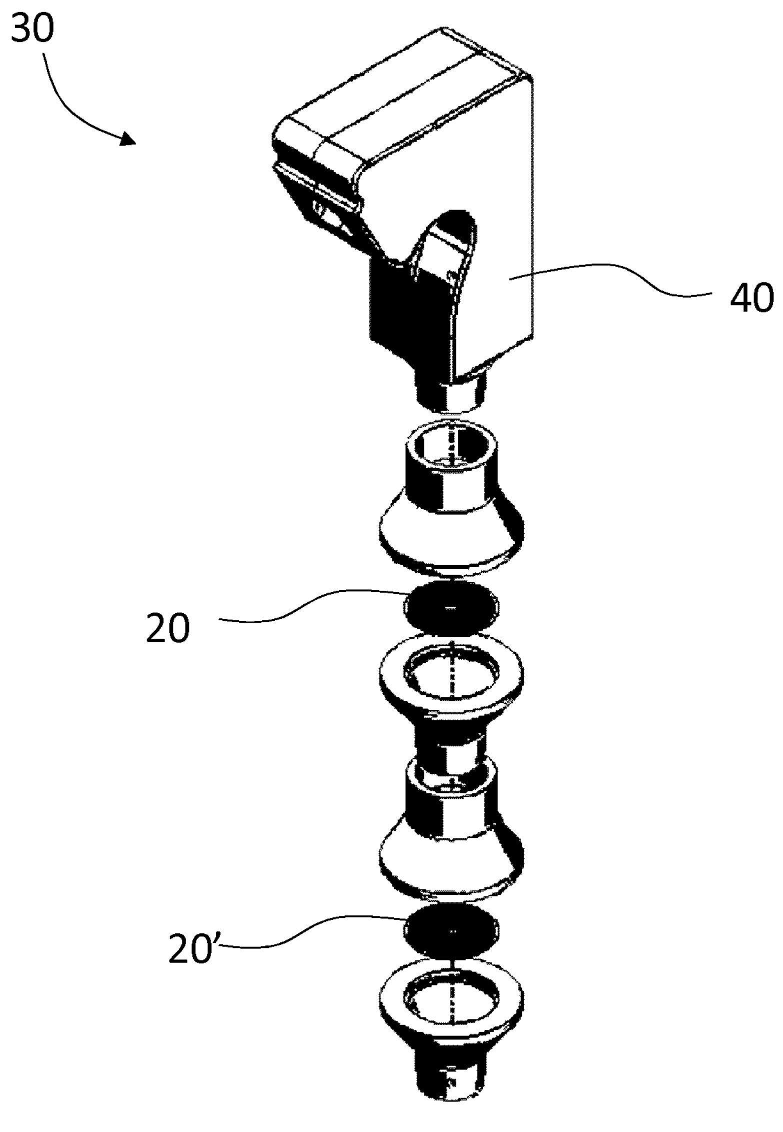
FIG. 5 is an exploded perspective view of the regional lung deposition system of FIG. 4.

FIGS. 4 and 5 show a form of a region lung deposition system 30 according to an embodiment of the present disclosure. With a single filter able to mimic trachea-bronchial deposition over such a wide range of flow rates, one embodiment, such as that shown in FIGS. 4 and 5, involves placing a filter 20, with similar physical properties to that shown in FIGS. 3A-3D, downstream of the Alberta Idealized Throat 40 (or other geometry that accurately mimics deposition in the extrathoracic region), with a second filter 20' downstream of the first filter 20 and finally, a breath simulator (not shown) downstream of the second filter 20'. In this way, deposition in the extrathoracic deposition is captured by the throat model, while trachea-bronchial deposition is captured by the first filter 20. Since many inhaled pharmaceutical aerosols are used with a breath hold, aerosol not depositing in the extrathoracic and trachea-bronchial regions will deposit in the alveolar region. Thus, by adding a second filter 20' (downstream of the first filter) that captures all aerosol penetrating the throat model and first filter 20, the second filter 20' approximates alveolar deposition. By using this set up with a breath simulator downstream of the throat and two filters, realistic time varying inhalation profiles obtained from patients using a given inhaler can be used to determine extrathoracic, tracheo-bronchial and alveolar deposition by assaying drug depositing in the throat, first filter 20 and second filter 20', respectively. Accordingly, a single carefully designed filter is able to match in vivo trachea-bronchial deposition over a wide range of flow rates. This result allows the above set up to provide estimates of regional lung deposition from an inhaler with realistic patient breathing patterns with considerably less effort than the existing approaches noted earlier.

Embodiments of the present disclosure further provide filters for different regions of the lung in addition to the trachea-bronchial and alveolar regions described above. According to some embodiments, the inventive filters are used for testing inter-subject variability in deposition in the different regions of the lung by being designed to mimic the lower and upper limits of expected in vivo regional lung deposition as opposed to mimicking the average regional deposition. Embodiments of the present disclosure also provide filters that mimic regional deposition in children or infants, with breath simulation supplying realistic pediatric inhalation profiles.

Figure 13A:
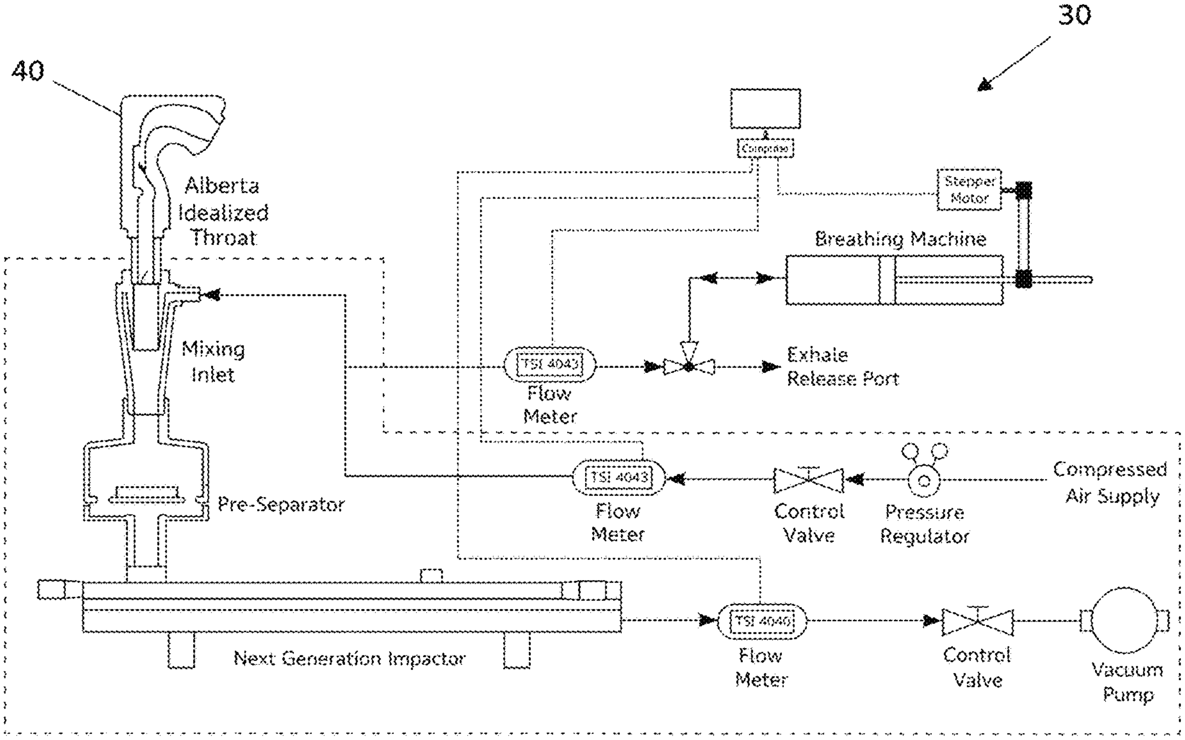
FIG. 13A is a schematic of an experimental set up for a regional lung deposition system using cascade impactor measurements.
Figure 13B:
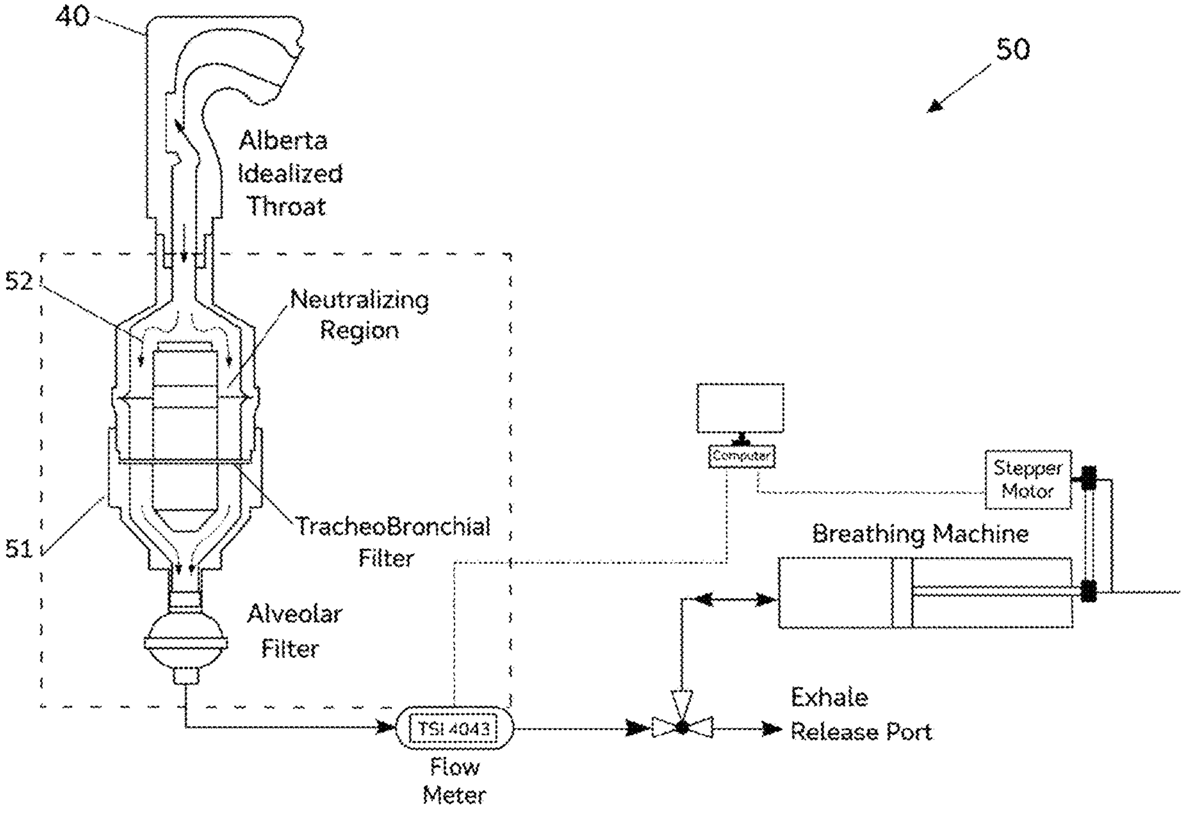
FIG. 13B is a schematic diagram of an experimental set up for a regional lung deposition system according to embodiments of the present disclosure.

According to further embodiments, the inventive apparatus 50, shown in FIG. 12 improves upon the regional lung deposition system 30 shown in FIGS. 4 and 5. In such a configuration, the performance of the TB filter 20 with the neutralizer device 52 is measured directly. The device is built such that the AIT 40 outlet interfaces directly with the device inlet 58. A final filter (H8-6301; KEGO Corporation, London, Canada) installed at the outlet of the TB filter housing collected all remaining particles. This filter is in fluid connection to a mass flow meter and the breathing machine that directly generates the appropriate inhalation profile through the entire apparatus. This configuration is shown in FIG. 13B, as compared with the configuration using the device of FIGS. 4 and 5, which is shown in FIG. 13A. The inhalation profile is calibrated to match the profile generated during the NGI experimental runs. The API landing in the AIT model and on the flow disruptor plate, on the TB filter, and on the final filter directly give the regional deposition estimates (URT, TB, and alveolar, respectively), which are then compared to the estimates provided by the in silico modeling of the NGI data.

Experimental Procedure

On each day of experimentation the ambient conditions are recorded. Pressure is recorded from one of the flowmeters while the apparatus is stagnant. Temperature and relative humidity are measured using a digital hygrometer/thermometer (MI70 Measurement Indicator and HMP75B Humidity and Temperature Probe; Vaisala, Vantaa, Finland). Ambient conditions (temperature, pressure, and relative humidity) ranged from 21-23° C., 90.7-94.5 kPa, and 13-26%.

For all experiments the interior surfaces of the clean, dry AIT 40 are coated with silicone release spray (Molycote 316; Dow Corning, Midland, MI, USA). This spray is also used on all stages of the NGI impactor plates and the pre-separator impactor plate. The propellant/solvent is allowed to evaporate for a minimum of 15 minutes before the equipment is assembled. A specialized 3D-printed adapter for the inhaler being tested is affixed to the AIT 40 inlet and the appropriate inhalation profile loaded into the breathing machine. For NGI runs, the vacuum pump pulling flow through the impactor is turned on and the flow set to 100 L/min. The makeup air supply to the mixing inlet is then adjusted to match, producing zero flow at the AIT 40 inlet. For runs with the TB filter device, no flow monitoring/matching is required. The only additional preparation step with the TB filter setup is to place a small amount of solvent on the flow disruptor plate. Using the assay solvent here eliminates bounce (similar to a liquid impinger) and makes for simple and effective collection of any API landing on this plate.

With the apparatus assembled and ready for the inhaler to be tested, the inhaler is primed and loaded following the directions in the leaflet supplied with the inhaler. When the dose is ready to be inhaled, the inhaler is brought to the AIT 40 and held firmly in place. The breathing machine is actuated and a single inhalation maneuver is generated through the device. For TB filter 20 runs, the neutralizer 52 is manually switched on just prior to generation of the inhalation and switched off when the machine is stopped. The inhaler is then removed from the adapter at the AIT 40 inlet. Valves in the system piping allow the piston of the breathing machine to return to the starting position with the resulting exhalation being directed out of a release port rather than through the system. In the case of the Breezhaler, the capsule is inspected to ensure it is completely empty; if powder remains, the inhalation procedure is repeated as per the product leaflet instructions. Subsequent doses (as per Table I) are delivered following the same procedure, in accordance with all product leaflet instructions.

When the predetermined number of doses is been delivered, the collection surfaces of the components are washed with HPLC-grade methanol ensuring API is collected in full. The AIT 40 is washed twice with 10 mL, NGI collection stages are washed with 5 mL, and the pre-separator and flow disruptor plate are also washed with 5 mL except in the case of the Twisthaler runs, where 10 mL is used due to increased deposition. The stainless-steel TB filters are washed twice with 10 mL of methanol, while the fibrous alveolar filters are washed with a total of 25 mL divided into three parts. The mass of API contained in each sample is quantified via ultraviolet light absorbance relative to a series of prepared standards. Absorption is measured using a UV-Vis spectrophotometer (Cary 8454; Agilent, Santa Clara, CA, USA) at 236, 243, 248, and 260 nm for fluticasone propionate (Diskus), budesonide (Turbuhaler), mometasone furoate (Twisthaler), and indacaterol maleate (Breezhaler), respectively. For each inhaler, the above procedures are repeated five times for each configuration to provide a measure of repeatability. Statistical comparisons of regional deposition estimates are performed using the two-tailed, unpaired student's t-test in Microsoft Excel 2016 (Microsoft, Redmond, WA, USA).

Results

The results of characterizing the inhalers with the NGI are given in Table II. Similarly, the results of testing the same inhalers with the regional deposition filter apparatus are given in Table III. In silico regional deposition estimates arising from NGI data are presented in Table IV alongside the in vitro regional deposition estimates from the TB filter and neutralizer apparatus.

TABLE II

Amount of API collected from each collection surface for runs using the NGI. Data is shown as average ± standard deviation for n = 5 runs.

| | Breezhaler ® | Diskus ® | Turbuhaler ® | Twisthaler ® |
|---|---|---|---|---|
| AIT (μg) | 88.2 ± 6.0 | 318.3 ± 19 | 248.1 ± 13.3 | 343.9 ± 32.6 |
| PS (μg) | 2.6 ± 2.4 | 0.0 ± 0.0 | 70 ± 20.7 | 260.1 ± 29.9 |
| NGI Stage 1 (μg) | 5.9 ± 0.4 | 9.7 ± 2.7 | 18.4 ± 2.5 | 12.5 ± 2.9 |
| NGI Stage 2 (μg) | 16.6 ± 0.5 | 26.7 ± 0.9 | 44.5 ± 5.2 | 18.3 ± 2.3 |
| NGI Stage 3 (μg) | 19.5 ± 0.5 | 26.9 ± 2.3 | 51.2 ± 3.1 | 21.2 ± 2.1 |
| NGI Stage 4 (μg) | 14.6 ± 0.8 | 19.7 ± 2.1 | 53.8 ± 2.8 | 21.0 ± 1.8 |
| NGI Stage 5 (μg) | 3.2 ± 0.7 | 1.2 ± 1.5 | 23.3 ± 1.2 | 8.3 ± 0.8 |
| NGI Stage 6 (μg) | 0 ± 0 | 0 ± 0 | 0 ± 0 | 0 ± 0 |
| NGI Stage 7 (μg) | 0 ± 0 | 0 ± 0 | 0 ± 0 | 0 ± 0 |
| NGI Stage 8 (μg) | 0 ± 0 | 0 ± 0 | 0 ± 0 | 0 ± 0 |
| MMAD (μm) | 2.95 ± 0.06 | 3.16 ± 0.10 | 2.63 ± 0.10 | 2.84 ± 0.10 |
| GSD | 1.81 ± 0.02 | 1.76 ± 0.04 | 1.94 ± 0.02 | 2.02 ± 0.07 |

AIT = Alberta Idealized Throat,
PS = Pre-Separator,
NGI = Next Generation Impactor,
MMAD = Mass Median Aerodynamic Diameter,
GSD = Geometric Standard Deviation

TABLE III

Amount of API collected from each collection surface for runs using the TB filter and neutralizer device. Data is shown as average ± standard deviation for n = 5 runs.

| | Breezhaler | Diskus | Turbuhaler | Twisthaler |
|---|---|---|---|---|
| AIT (μg) | 87.3 ± 4.7 | 302.5 ± 4.4 | 240.8 ± 19.9 | 342.9 ± 39.4 |
| Flow Disruptor (μg) | 4.3 ± 0.6 | 0.0 ± 0.0 | 64.7 ± 16.9 | 293.1 ± 44.0 |
| TB Filter (μg) | 29.9 ± 4.8 | 31.9 ± 4.2 | 56.8 ± 7.8 | 35.9 ± 3.8 |
| Final Filter (μg) | 36.2 ± 2.2 | 60.7 ± 4.6 | 136.1 ± 14.3 | 45.7 ± 4.7 |

AIT = Alberta Idealized Throat,
TB = Tracheobronchial

TABLE IV

Regional deposition estimates arising from the two different experimental configurations; in silico regional deposition based on cascade impactor data vs. fully in vitro regional deposition filter device.

| | Breezhaler | | | Diskus | | | Turbuhaler | | Twisthaler | | |
|---|---|---|---|---|---|---|---|---|---|---|---|
| | NGI + RegDep | | Filters | NGI + RegDep | | Filters | NGI + RegDep | Filters | NGI + RegDep | | Filters |
| URT (μg) | 90.8 ± 3.6 | | 91.7 ± 4.2 | 318.3 ± 17.3 | | 302.5 ± 4.0 | 318.2 ± 27.2 | 305.5 ± 32.0 | 604.0 ± 10.5 | * | 636.1 ± 18.3 |
| TB (μg) | 22.4 ± 0.6 | * | 29.9 ± 4.4 | 31.9 ± 2.8 | | 31.9 ± 3.8 | 51.9 ± 3.6 | 56.8 ± 7.1 | 27.8 ± 3.1 | * | 35.9 ± 3.4 |
| Alveolar (μg) | 37.5 ± 1.5 | | 36.2 ± 2.1 | 52.3 ± 3.8 | * | 60.7 ± 4.2 | 139.3 ± 6.5 | 136.1 ± 13.1 | 53.5 ± 4.6 | | 45.7 ± 4.3 |
| Total (μg) | 150.6 ± 5.4 | | 157.8 ± 7.4 | 402.5 ± 19.6 | | 395.1 ± 7.2 | 509.4 ± 30.1 | 498.4 ± 28.5 | 685.3 ± 7.4 | * | 717.6 ± 23.5 |

URT = Upper Respiratory Tract,
TB = Tracheobronchial,
NGI = Next Generation Impactor.
RegDep = In silico Regional Deposition model of (Javaheri et al., 2013),
* between values indicates statistically significant difference ($p < 0.05$)

Figure 14A:
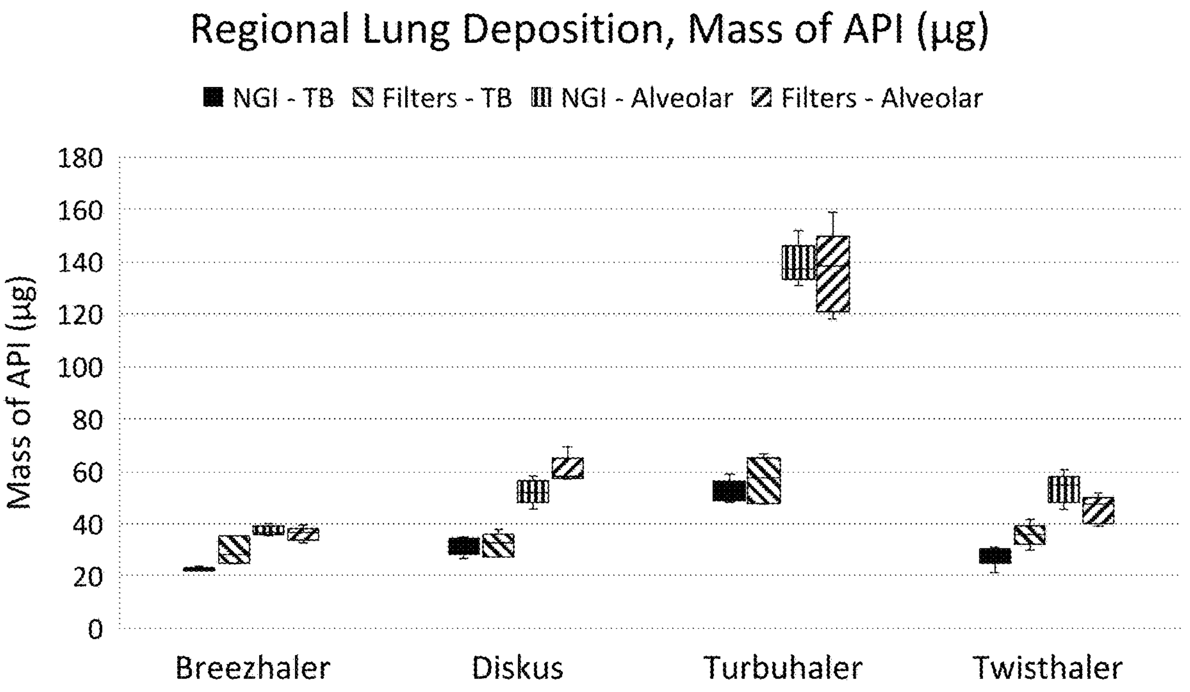
FIGS. 14A-14C are graphs showing various comparisons of the regional deposition estimates for each inhaler studied arising from cascade impactor measurements or direct measurements with the TB filter device, with overbar indicating a statistically significant difference ($p<0.05$)
Figure 14B:
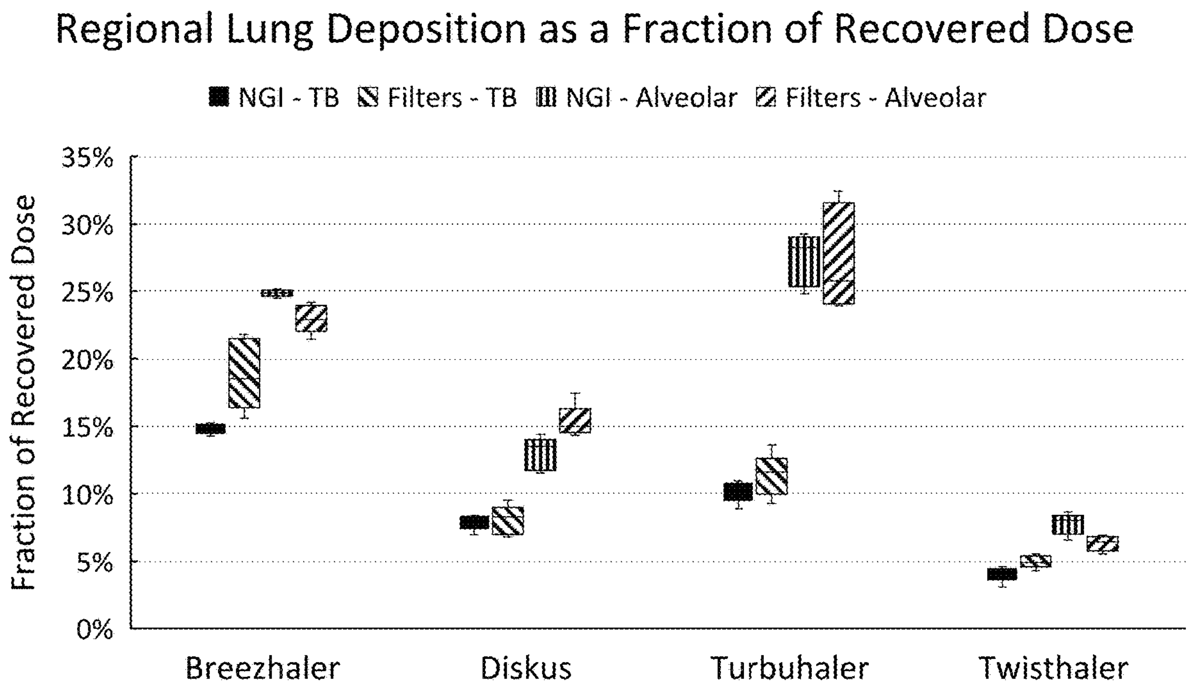
Figure 14C:
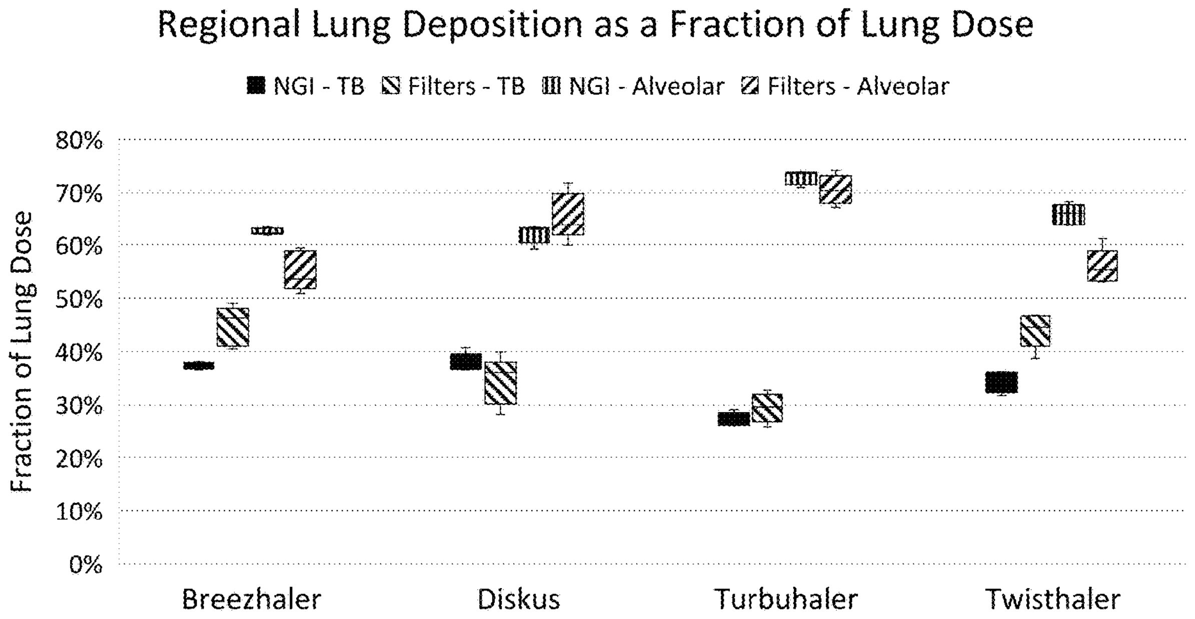

Since the masses collected on the flow disruptor plate and pre-separator are similar, it is safe to assume the aerosol classified by the NGI is representative of the aerosol travelling through the filter. Indeed, the total lung dose is the same for each experimental configuration ($p>0.05$). Excluding the flow disruptor and pre-separator dose from the tracheobronchial deposition estimates results in a pure comparison of the TB filter's ability to mimic the in silico deposition model. Comparison of the regional lung deposition between the two approaches can be done in terms of mass, fraction of recovered dose, or fraction of lung dose estimated to deposit in each location; all three such comparisons are shown in FIGS. 14A-14C, respectively.

Discussion

The above comparisons of regional deposition estimates show that the TB filter 20 satisfactorily mimics the estimated tracheobronchial deposition given by a regional deposition model applied to the sized mass as measured by cascade impaction. In some cases, the TB filter appears to capture slightly more mass than predicted by the regional deposition model, a discrepancy that could be due to incomplete neutralization or else a tendency of the filter to capture slightly more mass than is predicted by the model used here. Given the variations in predictions by different in silico models (14) and the large in vivo variability, we believe these differences are acceptable.

As expected, Table IV shows there is generally no significant difference in URT deposition since the AIT is used in both experimental configurations and the inhalation pattern is the same. Though URT is statistically different for the Asmanex Twisthaler®, the small difference is aligned with the statistically significant difference in total recovered API; these differences are not detected for any other inhaler.

While the ability of the custom ion generator 52 to neutralize the test aerosol is not directly measured, it is indirectly assessed by comparing the mass of budesonide recovered from the TB filter in runs where the neutralizer was not powered. These experiments are merely exploratory in scope, so a full data set is not presented here. However, for a Pulmicort Turbuhaler® (a different individual inhaler device than presented in Tables 2-4) the TB filter mass decreased from 101.4±16.7 μg when the neutralizer was not used to 47.4±14.0 μg when the neutralizer was powered at 10 kV (for 3 actuations per run, n=5 runs). This represents a reduction from 23.3±2.1% of the recovered dose to 10.3±2.1%.

Also being monitored during those exploratory experiments is the amount of API collected from a swab of the interior walls upstream of the TB filter in the neutralizing region. With the neutralizer off, 19.6±4.7 μg was recovered from the walls, but with the neutralizer at 10 kV this increased to 53.8±17.3 μg, or an increase from 4.5±0.9% of recovered mass to 11.5±1.7%. Further experimentation indicated that powering the neutralizer with 5 kV reduced wall losses to only 3.3±0.5% of the recovered dose while still adequately neutralizing the aerosol. This finding led to using the neutralizer with a potential difference of 5 kV in all further experiments. Wall losses are not monitored further as they are considered acceptable. Indeed, total recovery is consistent between all runs when comparing NGI runs and those using the TB filter device, indicating that the wall losses are similar in the two experiments.

While the total recovered dose is not of primary interest, in this research it serves as a measure of the integrity of the experiment being performed. For the Breezhaler®, Diskus®, and Twisthaler® devices total recovery as a percent of the label claim was 79.5±4.1%, 79.8±3.3%, and 87.7±3.1%, respectively. However for the Turbhuhaler®, the recovery dropped to 50.4±3.3% of label claim. The low recovery when using the Turbuhaler® is surprising when considering the satisfactory recovery of the other inhalers. It is not, however, without precedent. Hill & Slater (31) found an emitted dose from the Turbuhaler® of 46.0±14.6% of the label claim, while Hindle & Byron (32) found similarly low recovery and showed significant variability between devices.

The API collected from the pre-separator and the flow disruptor plate allows for some interesting speculation. The pre-separator is a carefully designed impactor stage intended to operate at a constant flow rate and to provide a sharp change in deposition efficiency (otherwise known as a cut-point). The flow disruptor plate is substantially different in that it operates under variable flow rate defined by the inhalation pattern used. For this reason, a calibrated cut-point cannot be defined. Despite this fundamental difference, a similar amount of API was collected on the pre-separator and the flow disruptor plate for each inhaler. While the pre-separator was always operated at 100 L/min, the flow disruptor plate saw peak flow rates as low as 60 L/min while still collecting a similar amount of API. Although it cannot be stated with certainty, it is likely that particles are sized similarly by the two and that the particles collected on these surfaces have bounced through the AIT and are relatively massive. This is supported by physical observations made during preliminary experiments with the Twisthaler® before solvent was used on the flow disruptor plate. Originally, the disruptor plate is sprayed with the same silicone release spray used to reduce bounce in the AIT and on the impactor stages. Despite the use of this spray in the AIT and on the flow disruptor plate, exceptionally large particles are observed on the TB filter after experimentation. Since these particles are visible to the naked eye, it was not believed that they could be avoiding contact with the flow disruptor. However, to investigate this possibility, solvent is placed in the flow disruptor plate and the experiment is repeated. The effects of this change are immediately visible as these large particles re no longer observed on the TB filter surface but instead are found in a pile in the solvent on the flow disruptor plate.

Figure 15A:
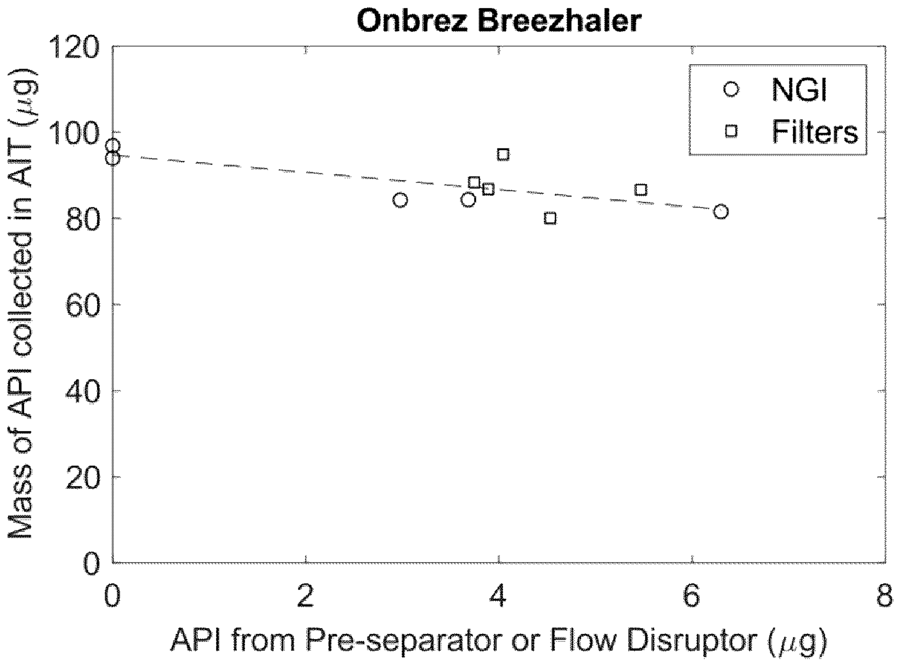
FIGS. 15A and 15B are graphs showing the relationship between API mass collected in the AIT vs on the flow disruptor or pre-separator immediately downstream of the AIT for the Onbrez Breezhaler® and the Asmanex Twisthaler, respectively, where series indicates the experimental configuration and the line of best fit is for aggregate data is R2=0.52 for FIG. 15A and R2=0.69 for FIG. 15B.
Figure 15B:
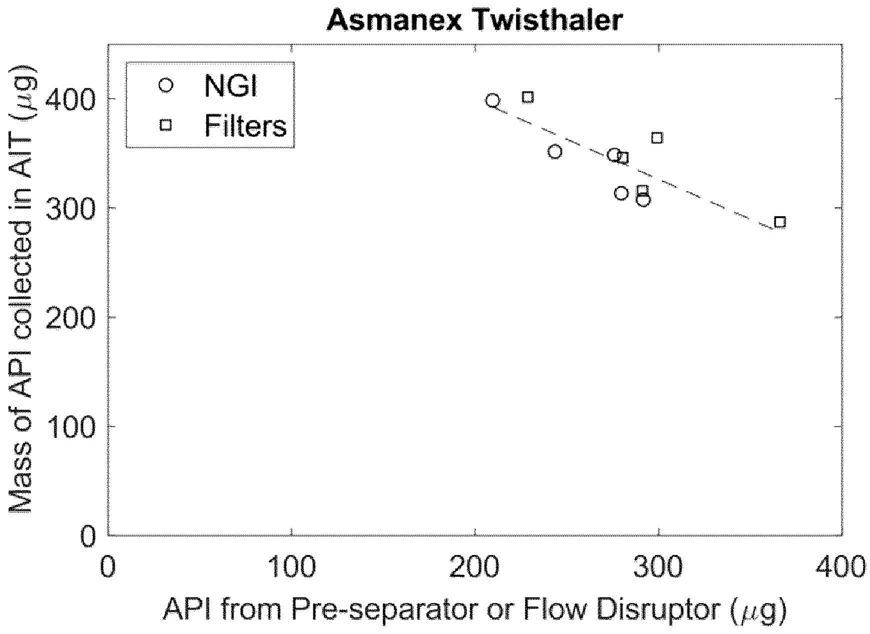

The notion that particle bounce is responsible for API being found on the flow disruptor plate and in the pre-separator is also supported by the variability observed between API recovery from the AIT versus the variability in URT deposition. Recall that URT deposition here is the sum of API recovered from the AIT and from the pre-separator or the flow disruptor plate (depending on the experimental configuration). Variability in URT deposition is reduced when compared to AIT deposition (see Table II, Table III, and Table IV) for the Twisthaler® and Breezhaler®. The amount of bounce occurring in the AIT for a given flow rate will depend on the AIT coating quality and the extent of deagglomeration occurring in the inhaler. For example, if slightly less coating is applied in a particular run more bounce may occur; however, if the inhaler powder deagglomerates well, the amount of bounce may decrease. Regardless of this interplay between coating quality and inhaler performance, if the pre-separator or flow disruptor plate is catching these bouncing particles, there should be an inverse relationship between the mass collected on these surfaces and in the AIT. That is, if particles bounce through the AIT (thereby reducing mass collected in the AIT) they should be recovered from the pre-separator or flow disruptor, where mass will be increased. This trend is confirmed for the Twisthaler® and Breezhaler® by plotting the mass recovered in the AIT against the mass recovered from the pre-separator or flow disruptor plate, as shown in FIGS. 15A-15B. This inverse relationship explains the reduction in variability of URT deposition relative to AIT deposition since URT deposition should be independent of bounce occurring in the AIT.

Figure 16:
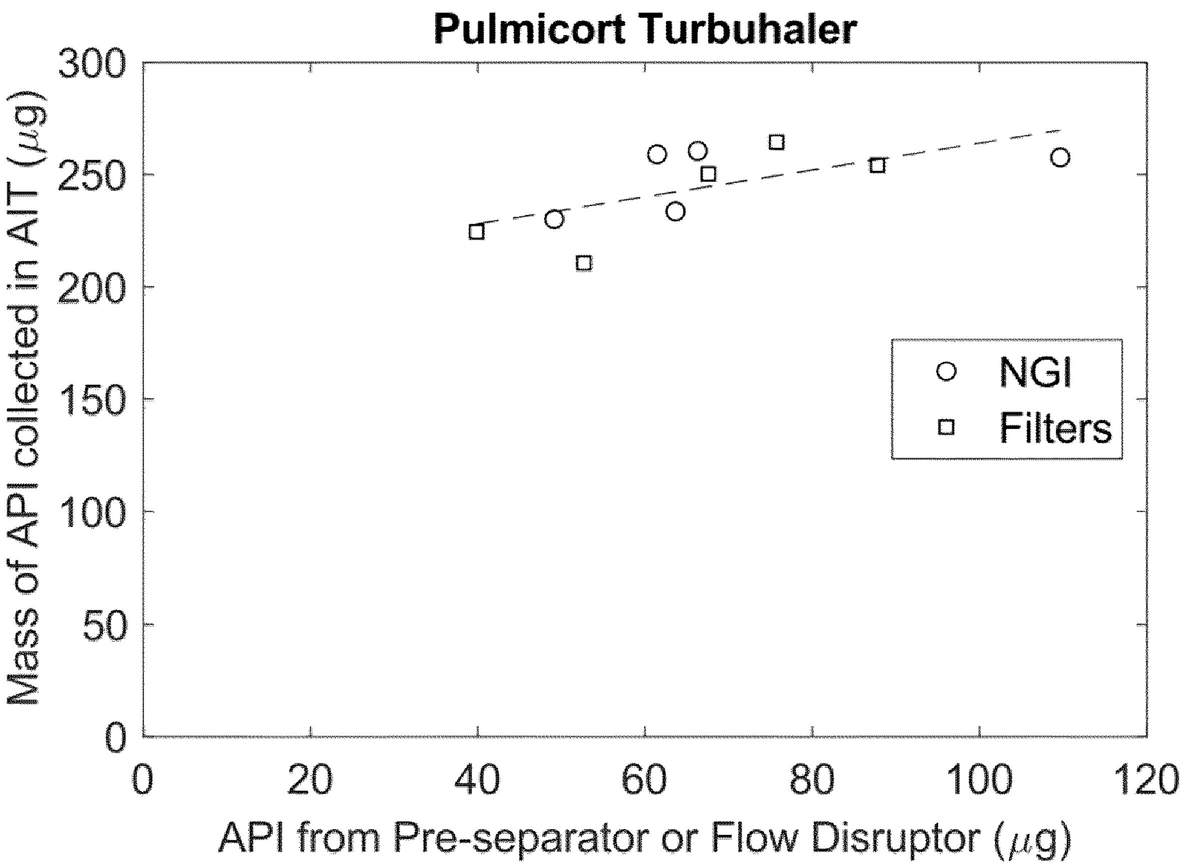
FIG. 16 is a graph showing the relationship between API mass collected in the AIT vs on the flow disruptor or pre-separator immediately downstream of the AIT for Pulmicort Turbuhaler, where series indicates the experimental configuration, and the line of best fit is for aggregate data ($R^2=0.43$)

The converse is observed for the Turbuhaler (FIG. 16). However, this difference could be explained by the lack of carrier particles used in this formulation. Since there are no large carrier particles, these particles are likely agglomerates of smaller particles of budesonide (33). While most of these particles will impact in the AIT, some do have the chance of traversing through and carrying significant mass with them. The positive linear relationship in FIG. 16 indicates that if more API is emitted from the inhaler in a particular run there is increased deposition in both locations, suggesting that these particles did not bounce through the AIT and could therefore be considered as TB deposition. This does not change the agreement between the two experiments; considering the pre-separator and flow disruptor plate mass as tracheobronchial deposition reduces URT deposition and increases TB deposition by nearly the same amount for the two experimental configurations.

These trends suggest that without further knowledge of the aerosol size distribution, the experimenter could identify whether mass landing on the flow disruptor plate should be considered URT or TB deposition by comparing the relationship between AIT and flow disruptor plate deposition Conclusions The ability of a filter mimicking tracheobronchial deposition to collect the correct fraction of particles exiting the Alberta Idealized Throat has been demonstrated with commercially available dry powder inhalers. This filter provides a fast method to estimate in vivo regional lung deposition using in vitro inhaler testing. Electrostatic charge on the aerosol particles has the potential to cause the TB filter to remove more particles than intended, but this issue is resolved by using an alternating current corona discharge ion generator integrated into the filter housing to quickly and adequately neutralize the aerosol just upstream of the filter. This apparatus can be used directly downstream of the AIT and has a small enough internal volume to allow direct testing of inhalers with the inhalation maneuvers expected to be performed by patients using the device. The apparatus presented here is useful as a tool for inhaler product research and development.

Further Methods

Regional deposition estimates are obtained for three different commercially available pMDI devices: Asmanex HFA (Lot U019924, Merck & Co., Inc., Whitehouse Station, NJ, USA), QVAR (Lot GUL037A, Valeant Canada LP, Laval, Canada), and Ventolin HFA (Lot RX4E, GlaxoSmithKline Inc., Mississauga, Canada). Additional inhaler details are available in Table. Each inhaler is tested under constant flow conditions of 30 and 60 L/min. For all experiments, an AIT is used as the induction port to mimic extrathoracic filtration. The aerosol exiting the AIT is interpreted as the in vitro lung dose. The lung dose is further divided into TB and alveolar doses using two distinct methods. In the first method, the aerosol exiting the AIT is supplied directly to the FBA, with the TB and alveolar doses collected on their respective, representative filters. In the second method, the aerosol exiting the AIT is characterized using a cascade impactor, with the results then being used as input to an in silico regional lung deposition model. For each experiment, regardless of the method employed, the inhaler is actuated into the apparatus five times and each experiment is repeated five times. Regional deposition estimates arising from the two experimental methods are then compared.

TABLE V

| List of pMDI devices studied and select attributes | | | | | | |
|---|---|---|---|---|---|---|
| Inhaler | API | Doses | Label Claim (μg of API per actuation) | Formulation Type | Propellant | Excipients |
| Asmanex HFA | Mometasone furoate | 120 | 100 | Suspension | HFA-227 | Ethanol, oleic acid |
| QVAR | Beclomethasone dipropionate | 200 | 100 | Solution | HFA-134a | Ethanol |
| Ventolin HFA | Salbutamol sulfate | 200 | 100 | Suspension | HFA-134a | None |

Filter-Based Regional Deposition Estimates

Figure 17:
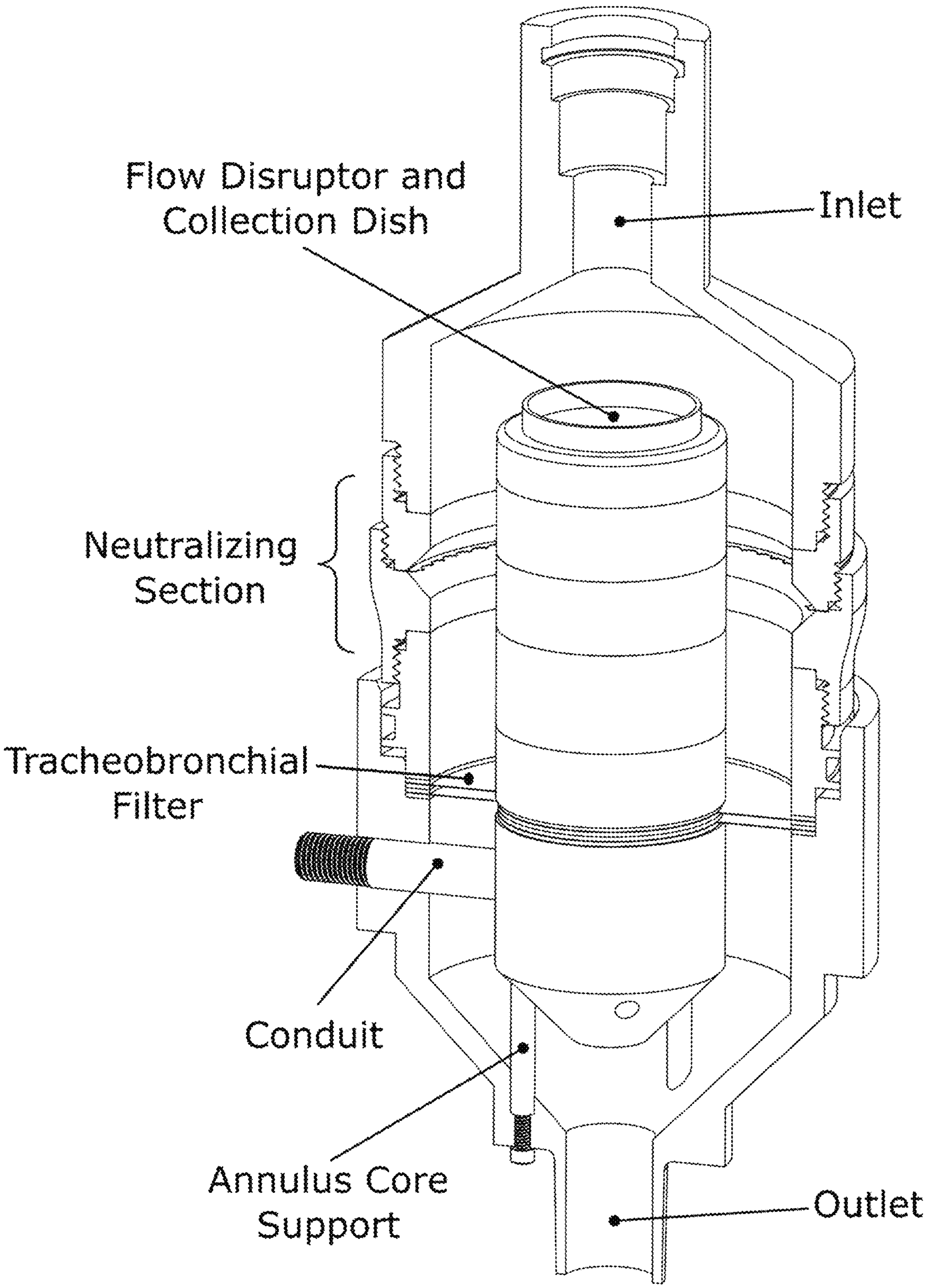
FIG. 17 is a partial section view of a TB Filter housing according to embodiments of the present invention, in which external components have been sectioned to reveal the interior assembly and flow path to which the aerosol exiting the AIT is exposed.

While the fundamental component of the filter-based approach when estimating regional deposition is the carefully-designed TB filter, the housing that holds this filter includes various additional functional design elements. Most notable are the use of an annular flow field and an integrated electrostatic neutralizer, as shown in FIG. 17. The housing inlet is machined to interface with the AIT outlet with an airtight seal and matching internal dimension to minimize particle losses. This 16 mm internal diameter section extends for 20 mm and then rapidly expands with a 60° draft angle to 75 mm. After expansion, the flow field is interrupted and abruptly changes to an annular shape with major and minor diameters of 75 and 45 mm, respectively. The top of the annular core (also called the flow disruptor plate) is 33 mm downstream from the onset of the rapid expansion; the axis of the core is colinear with the axis of the AIT outlet. Rapid expansion and interruption of the flow are used to force the laryngeal jet off the anterior wall of the AIT trachea and then distribute the energy into the bulk flow, providing a relatively uniform flow down the annular gap towards the TB filter. Without these flow alterations, the laryngeal jet would result in a localized section of high flow through the TB filter, causing the filter's face velocity and filtration to be higher than intended. As large particles penetrating the AIT may deposit at the flow disruption point, a collection dish is incorporated into the top of the annulus core. This dish has 5 mm tall walls and an internal diameter of 33 mm.

As the aerosol flows down the annular channel, it passes through a neutralizing section where alternating current corona discharge is used to generate bipolar ions. The outer electrode is an internally serrated ring of 0.003" (0.08 mm) thick 304 stainless steel located 33 mm downstream from the top of the annulus core. The tips of the serrations act as corona onset locations and are separated from the 'core electrode' by a distance of 17 mm; an electrode separation larger than the annular gap was used to keep the electrode tips out of the flow path. The outer electrode is axially centred on the core electrode, which is a smooth stainless-steel ring 15 mm long forming part of the annular core (diameter of 45 mm). A potential difference of 5 kV is applied between the two electrodes which ionizes the air near the serrations of the outer electrode; the ions then travel across the annular gap towards the core electrode. If an ion encounters an oppositely charged aerosol particle along the way, it will be attracted to the particle and reduce its static charge. The exact charge state of aerosol leaving the neutralizing region has not been measured; however, filtration measurements have shown that the use of the neutralizer improves agreement between TB filter measurements and traditional methods of estimating regional deposition [41].

After leaving the neutralizing region, the aerosol encounters the TB filter. This filter has been carefully designed to have a filtration efficiency that mimics the average deposition efficiency of the TB region of the lungs [14], including both aerosol size and inhalation flow rate effects. The face area of this filter is an essential metric that dictates the annular radii. The filter is located 42 mm downstream of the outer electrode ring and 75 mm downstream of the top of the annular core. Two layers of highly specific stainless-steel mesh comprise the filter; the first layer uses 25 μm diameter wire woven with 500 wires per inch in each direction, while the second layer uses 30 μm wire and 400 wires per inch (SV-26/25tw, SV-34/30tw; ASADA MESH Co., Osaka, Japan). The stainless-steel mesh is spot welded between 1 mm thick stainless-steel rings to hold the mesh taught. As a result, the mesh filter elements are separated by 2 mm. After traversing the TB filter, the annular section extends for an additional 30 mm, then with a 45° draft angle the annulus core and outer walls constrict. The annulus cone ends when the diameter reaches 15 mm and the outer walls return to a straight pipe flow when the diameter reaches 18 mm. Finally, this straight pipe section extends for 29 mm to the outlet of the TB filter housing. A commercially available filter with a standard 22 mm ID connection (H8-6301; KEGO Corporation, London, Canada) installs on the outlet of the TB filter housing to collect the remaining aerosol. The total internal volume, or 'dead space', of the TB Filter housing is 488 mL, while the dead space from the inlet of the housing to the TB filter elements is 310 mL. A rendering of the TB Filter assembly is shown in FIG. 17.

Figure 18:
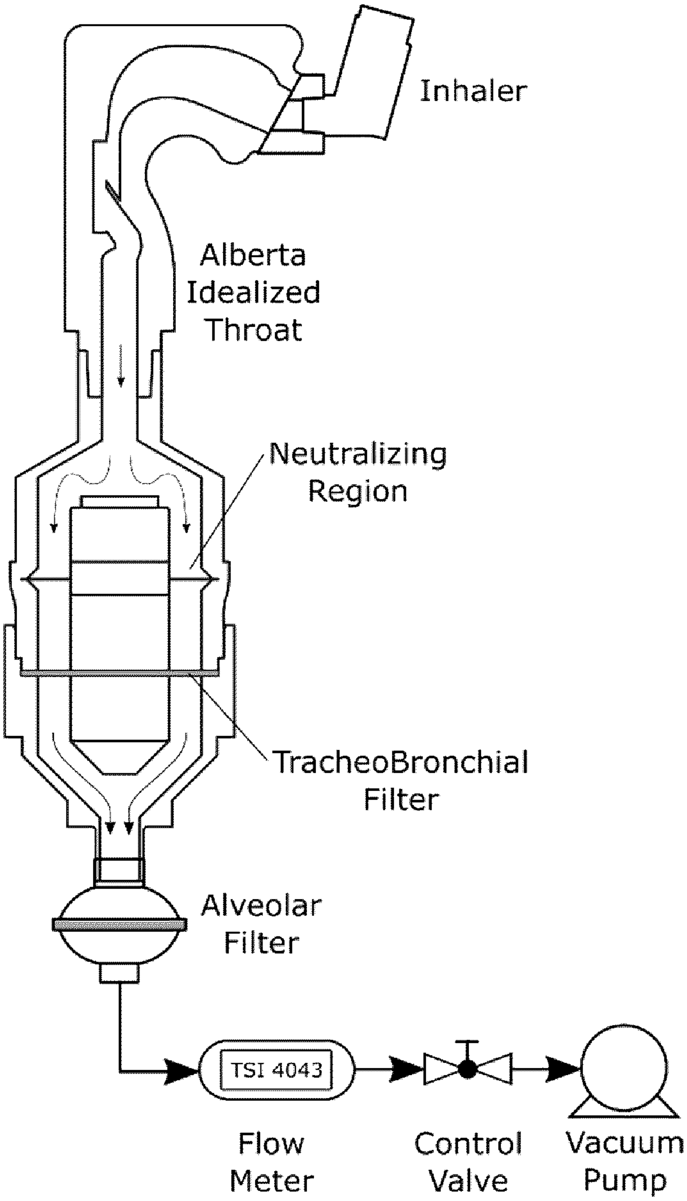
FIG. 18 is a schematic representation of a filter-based apparatus according to embodiments of the present disclosure configured for constant flow.

The desired flow rate through the apparatus was generated by a vacuum pump (0523, Gast Manufacturing Inc., Benton Harbor, MI, USA), controlled using a needle valve, and monitored with a mass flow meter (4043, TSI Incorporated, Shoreview, MN USA). A schematic representation of this experimental configuration is shown in FIG. 18.

Cascade Impactor Based Regional Deposition Estimates

Figure 19:
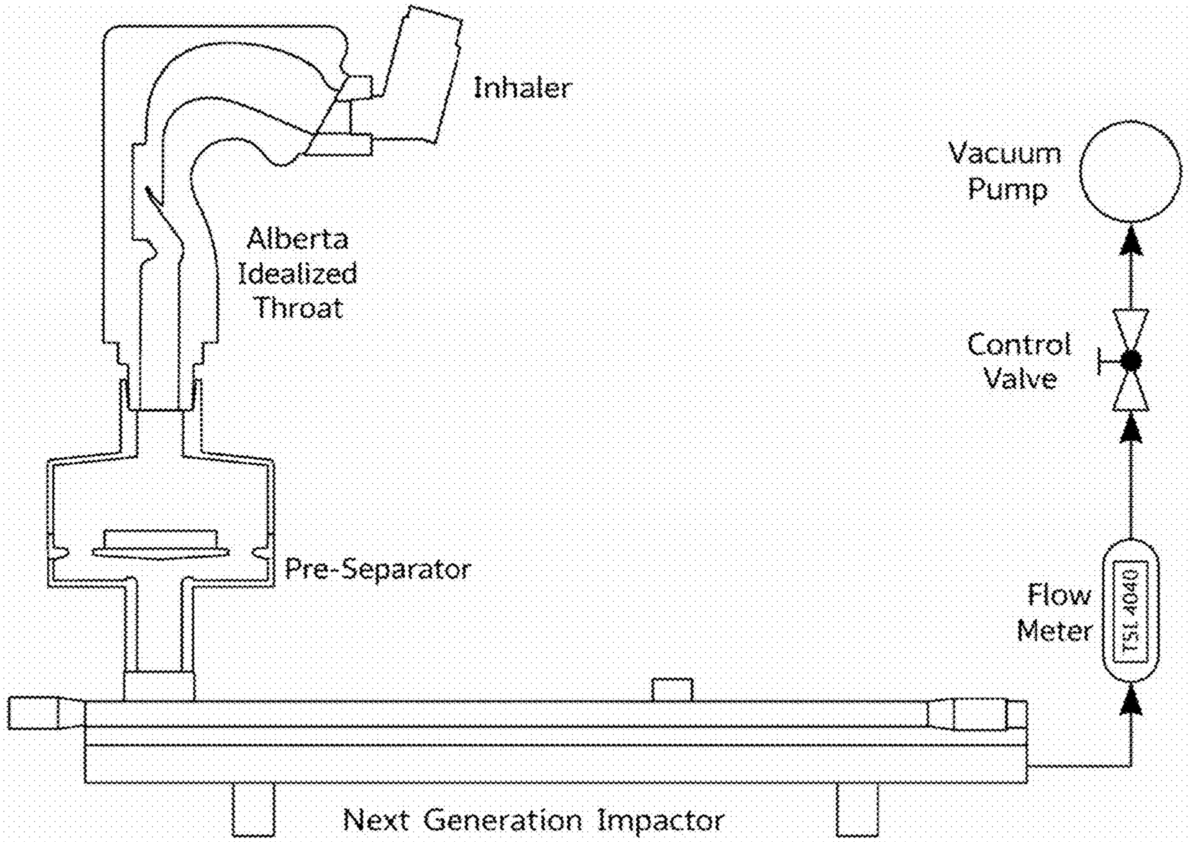
FIG. 19 is a schematic representation of an apparatus according to embodiments of the present disclosure configured for constant flow.

In the more traditional method of estimating regional deposition, the inhaler is actuated into the AIT, which is upstream of a Next Generation Impactor (NGI) including a pre-separator stage (MSP Corporation, Shoreview, MN, USA). A vacuum pump (Model KSV, General Signal, Canton, Massachusetts) generates the desired flow through the apparatus, which is set manually with a ball valve and monitored with a mass flow meter (4040, TSI Incorporated). A schematic representation of this experimental configuration is shown in FIG. 19.

Aerodynamic particle size distributions determined using the NGI are used as input to the in silico regional deposition model described by Javaheri et al. [25]. Since the AIT is already used to remove the extrathoracic fraction, extrathoracic deposition is not modeled. The model divides the breath into 1000 bolus fractions and propagates each one sequentially through a 1D symmetrical branching lung model with dimensions given by [30]. The aerosol classified by the NGI is evenly distributed between all bolus fractions and thus not all particles will reach the final generation of the model lung. Deposition equations for sedimentation [27, 28], diffusion [29], and impaction are used to estimate deposition in each generation of the lung under inhalation, breath hold, and exhalation. In this study the inhaled volume was 2.7 L, the inhalation time is set to 5.4 s or 2.7 s corresponding to 30 and 60 L/min inhalation flow rate, a breath hold of 10.0 s is used and exhalation time is 7.0 s. The model permits aerosol that evades deposition in the lung to be exhaled, which is important in predicting lung deposition for some nebulized aerosols inhaled under tidal breathing [9]. However, for single breath inhalers it is expected that most aerosol will deposit due to gravitational settling during breath holding [42]. Indeed, the exhaled dose calculated for the conditions used here is less than 10% of the lung dose, so, to draw a closer comparison to the filter-based apparatus, only the TB estimate is used from this model, while the alveolar dose is considered to be the lung dose less the TB estimate.

Further Experimental Procedure

Ambient conditions are recorded on each day of experimentation; ambient air temperature and relative humidity are recorded from a digital thermometer/hygrometer (TH-1, Amprobe, Everett, WA, USA), and atmospheric pressure is recorded from the mass flow meters while they are open to the atmosphere under zero flow.

Collection surfaces of the AIT, NGI, and pre-separator are coated with silicone release spray (Molycote 316; Dow Corning, Midland, MI, USA) to reduce particle bounce and re-entrainment. To allow the propellant and solvents in the spray to evaporate, 15 minutes is allowed to elapse after spraying before the instruments are assembled. To ensure full collection of any particles impacting at the flow disruptor plate, ~2 mL of the assay solvent is added to the collection dish; a disc of stainless-steel mesh was fitted into the bottom of the collection dish to promote wetting of the surfaces while using less solvent to reduce the chance of solvent splashing over the collection dish walls (which was observed to occur occasionally during preliminary experiments). No surface preparation is required for the TB Filter elements or the commercial final filter.

A 3D-printed adapter, unique to each inhaler tested, is affixed to the AIT inlet. These adapters closely match the mouthpiece geometry, ensuring a snug, airtight fit and consistent positioning of the inhaler relative to the AIT inlet. The adapters used in this study hold the inhaler in the 'transverse' orientation to the AIT, i.e., the axis of the mouthpiece and the aerosol plume is horizontal despite the axis of the oral cavity of the AIT being angled upwards at 29°, as shown in FIGS. 18 and 19. In this orientation, the aerosol plume is directed towards the surface of the tongue, which can cause increased extrathoracic deposition depending on the pMDI properties [43]. This orientation is expected to be more representative of in vivo usage of inhalers [43].

With the collection surfaces adequately prepared and the appropriate adapter affixed to the AIT inlet, the equipment is assembled into the configuration being used (NGI or FBA). The vacuum pump is turned on and throttled to the appropriate volumetric flow rate; at this point the apparatus is ready for the inhaler to be actuated into it. Inhalers are primed following the leaflet directions before use for the first time; Ventolin HFA and Asmanex HFA are shaken well before every actuation, whereas QVAR is not, as per leaflet instructions. The vacuum pump remains on for the duration of the experiment; for runs with the TB Filter apparatus, the neutralizer is switched on just prior to actuating the inhaler and switched off approximately two seconds afterwards. The inhaler is removed from the AIT inlet and approximately ten seconds is allowed to elapse before the next actuation is performed.

After five actuations of the inhaler, the vacuum pump is switched off and API is recovered from collection surfaces by rinsing with HPLC grade methanol (Asmanex HFA and QVAR) or a 1:1 v/v mixture of HPLC grade methanol and deionized micron filtered water (Ventolin HFA). The AIT and alveolar filters are extracted with 25 mL of solvent divided into three washings but collected into a single 25 mL sample. The NGI and pre-separator impactor plates and the flow disruptor plate are washed with 5 mL of solvent, while the TB Filter is washed with 10 mL. When testing with QVAR, only 6 mL is used to extract API from the TB Filter to increase the sample concentration since TB deposition with QVAR is low. Ultraviolet light absorbance is used to quantify the mass of API in each sample, absorbance is measured using a spectrophotometer (Cary 8454, Agilent, Santa Clara, CA, USA) and concentration was quantified relative to absorbance measured in a series of dilutions of a prepared stock solution. Absorbance is measured at 226, 240, and 248 nm for salbutamol sulfate (Ventolin HFA), beclomethasone dipropionate (QVAR), and mometasone furoate (Asmanex HFA), respectively. Blank samples are made by preparing and washing the collection surfaces following the normal experimental procedure but without actuating the inhaler into the apparatus; absorbance is measured relative to these blank samples to eliminate interference of external compounds potentially absorbing near the API peak. Five replicate measurements are performed for each combination of inhaler, flow rate, and experimental configuration. Statistical comparisons are performed in Microsoft Excel 2019 (Microsoft, Redmond, WA, USA) using two-tailed, unpaired students t-tests.

Further Results

Experiments are performed at ambient conditions (temperature, pressure, relative humidity) ranging from 21.0 to 24.7° C., 91.6 to 94.2 kPa, and 8.0 to 29.3% RH. Total recovered dose is independent of the experimental configuration ($p>0.05$) and is 110.5±4.1% of the label claim for Ventolin HFA, 96.7±4.3% of the label claim for Asmanex HFA, and 65.5±5.5% of the label claim for QVAR. For Asmanex HFA and QVAR, no API is detected on either the pre-separator or the flow disruptor plate. For Ventolin HFA, API detected on the pre-separator is independent of flowrate ($p>0.05$) and is only 3.3±1.9 μg (less than 1% of recovered API). API is detected on the flow disruptor plate for only two runs with Ventolin at 60 L/min (13.3 and 2.8 μg) when testing with the TB Filter apparatus. Since API on the pre-separator and flow disruptor plate is generally zero or negligible, it is added to the mass recovered in the AIT, consistent with previous study [41], referred to herein as aggregate upper respiratory tract (URT) deposition.

Figure 20:
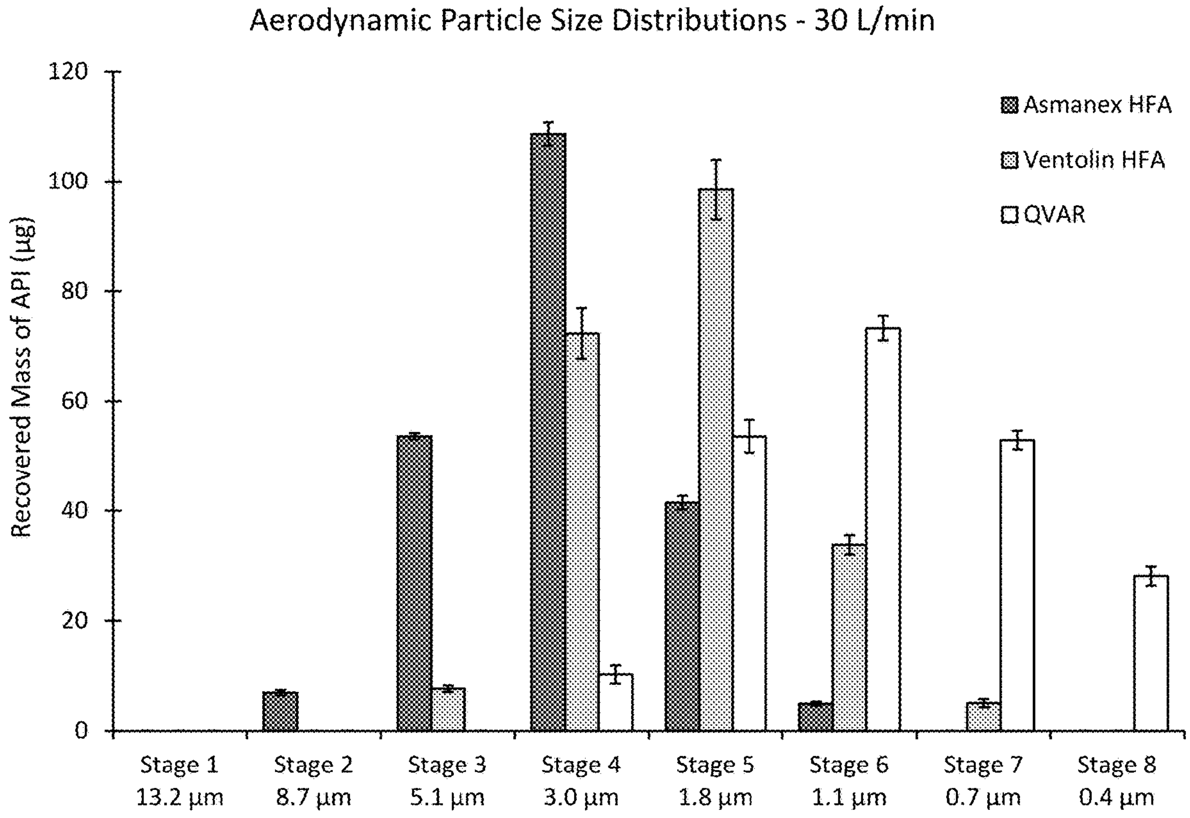
FIG. 20 is a graph showing mass of API detected on each stage of an inventive apparatus when operated at 30 L/min, in which diameter values listed are the geometric centres for each stage, error bars represent the standard deviation of n=5 repeat measurements, and lognormal distribution parameters for each inhaler, listed as MMAD±GSD, are: Asmanex HFA 3.26 μm±1.60, Ventolin HFA 2.03 μm±1.61, QVAR 1.03 μm±1.80.
Figure 21:
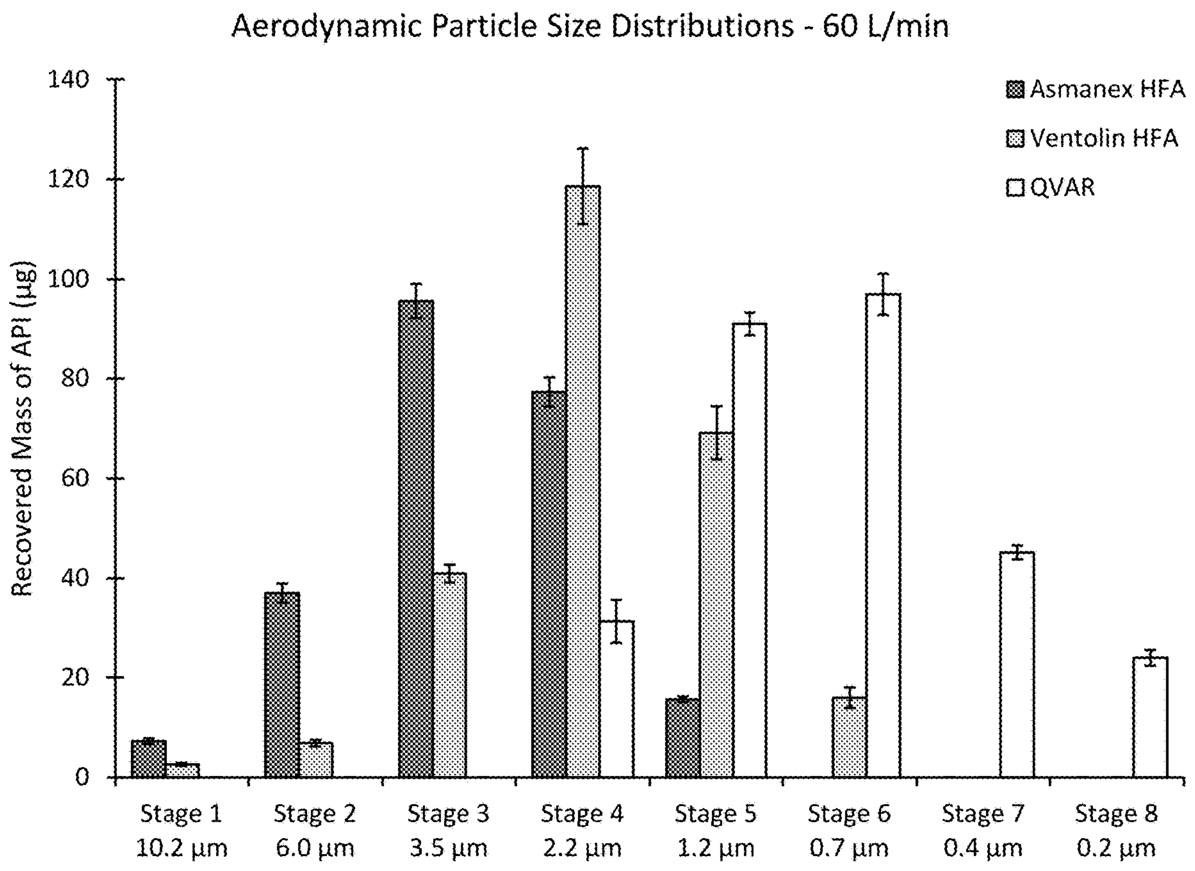
FIG. 21 is a graph showing mass of API detected on each stage of an inventive apparatus when operated at 60 L/min, in which diameter values listed are the geometric centres for each stage, error bars represent the standard deviation of n=5 repeat measurements, and lognormal distribution parameters for each inhaler, listed as MMAD±GSD, are: Asmanex HFA 3.22 μm±1.61, Ventolin HFA 2.07 μm±1.64, QVAR 0.85 μm±1.87.
Figure 22:
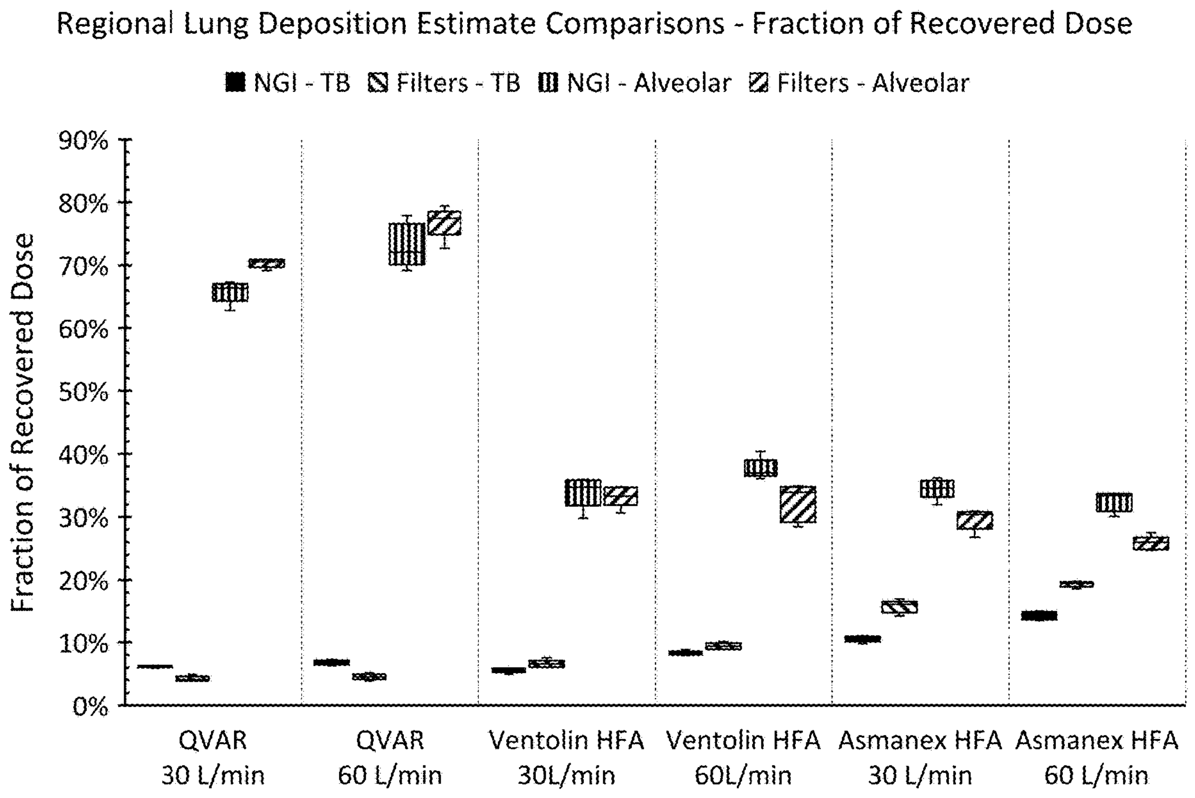
FIG. 22 is a graph showing a comparison of regional deposition estimates for each inhaler and flow rate studied, for which in the 'NGI' series, the regional deposition estimates are the results of using cascade impactor data as input to the regional deposition model given by Javaheri et. al., while for the 'Filter' series the regional deposition estimates are measured directly.

The aerodynamic particle size distribution data from the cascade impactor runs is shown in FIGS. 20 and 21. The regional deposition estimates from this data are shown in Table alongside the regional deposition estimates given directly by the regional deposition filter apparatus. Graphical comparison of the regional deposition estimates given by the two different experimental configurations as shown in FIG. 22.

TABLE VI

Comparison of regional deposition estimates from the two experimental methods; modeled after cascade impactor measurements (NGI+RegDep) or measured directly using the filter-based apparatus (Filters).

| | | QVAR | | | Ventolin HFA | | | Asmanex HFA | | |
|---|---|---|---|---|---|---|---|---|---|---|
| | | NGI + RegDep | | Filters | NGI + RegDep | | Filters | NGI + RegDep | | Filters |
| 30 L/min | URT (µg) | 84.9 ± 9.2 | | 78.7 ± 1.7 | 331.6 ± 23.7 | | 335.0 ± 23.5 | 263.3 ± 17.0 | | 261.0 ± 19.8 |
| | TB (µg) | 18.6 ± 0.9 | * | 13.3 ± 1.4 | 30.7 ± 1.6 | * | 37.0 ± 2.4 | 50.5 ± 0.8 | * | 75.7 ± 3.9 |
| | Alveolar (µg) | 199.5 ± 8.1 | * | 218.9 ± 5.6 | 186.6 ± 9.7 | | 185.7 ± 8.8 | 165.1 ± 2.7 | * | 142.0 ± 5.6 |
| | Total (µg) | 303.0 ± 16.4 | | 310.9 ± 7.4 | 548.9 ± 19.2 | | 557.7 ± 27.8 | 478.9 ± 15.0 | | 478.7 ± 19.8 |
| 60 L/min | URT (µg) | 72.9 ± 15.2 | | 62.5 ± 12.7 | 298.9 ± 9.8 | | 320.6 ± 17.0 | 264.8 ± 22.3 | | 262.0 ± 11.7 |
| | TB (µg) | 24.6 ± 0.7 | * | 15.2 ± 0.8 | 45.8 ± 2.5 | * | 52.0 ± 2.7 | 71.2 ± 2.9 | * | 92.7 ± 3.0 |
| | Alveolar (µg) | 263.9 ± 4.5 | | 256.9 ± 8.4 | 208.3 ± 12.1 | * | 178.4 ± 15.4 | 161.7 ± 5.5 | * | 123.8 ± 6.1 |
| | Total (µg) | 361.4 ± 16.0 | | 334.7 ± 20.4 | 553.0 ± 15.4 | | 550.9 ± 15.2 | 497.7 ± 25.7 | | 478.5 ± 16.7 |

Results are given as mass of API, listed as average ± standard deviation for n = 5 runs. Asterisk between values indicates statistically significant difference using a student t-test ($p < 0.05$)

Further Discussion

The FBA is developed with the intention of alleviating the burden associated with compendial testing methods when estimating regional deposition. The resource burden is vastly reduced in the laboratory by reducing the number of collection surfaces to assay. There are only four collections surfaces to assay when using the FBA (AIT, flow disruptor plate, TB Filter, alveolar filter) but 10 collections surfaces when using the NGI (AIT, pre-separator, 8 NGI stages). The resource burden associated with interpreting the results using the FBA is nearly completely eliminated because there is no post processing required to arrive at regional deposition estimates since they are measured directly. The lung dose is well quantified by adopting the AIT as the induction port; if the TB Filter removes the appropriate dose from the flow, then both the TB and alveolar fractions will be accurately estimated.

The comparison of regional deposition estimates given by the two methods in FIG. 6 demonstrates that the filter-based method provides reasonable estimates that account for differences due both to particle size and to inhalation flow rate. The particle size dependence is not explicitly shown in FIG. 6; however, the inhalers have been grouped from smallest to largest MMAD along the x-axis to demonstrate the effect of particle size. From this manner of grouping, it appears that the TB Filter somewhat overpredicts TB deposition relative to the regional deposition model for coarser aerosols. This result is not unexpected as the filtration curves for the TB Filter given by were given only for particle sizes up to 3.3 µm, and the filter curves appear to cross above the deposition model curve around this point. For Asmanex (where the difference between estimates is greatest), there is significant mass reaching the in vitro lungs in particles larger than 3.3 µm, which will be collected in greater proportions than the in silico regional deposition model predicts. This difference is considered to be acceptable for the reasons that follow. First, the in silico regional deposition model is used here only as a guide, since the in silico result will depend on which regional deposition model (of which there are many) is used, and in vivo regional deposition will vary considerably from person to person. Furthermore, statistically significant differences in regional deposition estimates here are largely the result of the high repeatability of each method (with commensurately small standard deviations), and it is unlikely these differences would translate to clinically significant differences.

Exploratory experiments are conducted to investigate the effect of electrostatic charge on the filtration of the TB Filter and the necessity of using the neutralizer. While this has not explicitly measured the charge state of the pMDI aerosols used here before and after neutralization by our custom ion generator, limited measurements have been conducted with and without powering the neutralizer to investigate its effectiveness. These measurements are performed for the QVAR and Ventolin HFA inhalers, both of which are also studied by Leung et al. who measured the bipolar charge distribution of aerosols emitted by the pMDIs using a Bipolar Charge Analyzer (BOLAR).

We have previously discussed electrostatic effects in detail and do not expect the charge levels associated with pharmaceutical aerosols to significantly affect in vivo deposition in the TB region. However, electrostatic charge on the aerosol can significantly affect the filtration efficiency of the stainless-steel TB Filters, where image charges will readily be induced due to their conductive nature. The pore sizes of the TB Filters are 25 and 30 µm, whereas the diameter of the most distal generation of the TB region of the lung is expected to have a diameter around 20× larger [12]. Electrostatic attractive forces are inversely proportional to the squared separation distance, so the electrostatic attractive force in the TB Filter could be 400× higher than in the most distal generation of the TB region, and even higher in more proximal generations.

In the present experiments, when the neutralizer is not powered, deposition on the TB filter increases by 82% and 30% relative to experiments where the neutralizer is active for QVAR and Ventolin HFA, respectively. These results are aligned with the charge distributions measured by Leung et al. [44], who found that QVAR and Ventolin produced aerosols with very different charge characteristics. Ventolin HFA produced aerosol with relatively low charge-to-mass ratios (~25 μC/μg) and no API was detected in the smallest size bin of the BOLAR ($d_p$<0.95 μm), whereas the smallest bin collected the most mass when testing the QVAR, and the charge-to-mass ratio magnitude associated with these particles was >200 μC/μg. The highly charged, small particles associated with the QVAR are likely the most susceptible to electrostatic effects due to their high physical mobility. Further, more extremely charged particles could drive the deposition enhancement while mildly charged particles are less affected. The increase in deposition on the TB Filter when the neutralizer is not used is in relative agreement with the magnitude of previously measured charge profiles for these inhalers.

The two experimental configurations provide similar results for upper respiratory deposition, as the AIT is used as an induction port in both experiments. For this study, the total recovered dose from each inhaler is used to compare the recovery efficiency of the filter-based method to the established, cascade impactor method. No significant difference in recovered dose is seen between the two methods, indicating the particle losses within the NGI and the TB Filter housing are similar. While this is the primary comparison, it is also expected that total recovered dose lies between 75 and 125% of the label claim as required by [35]. The recovered dose found for QVAR is not within this range, but this is largely explained by the fact that the label claim is the ex-valve dose. The product monograph states that each actuation delivers 80 μg from the actuator. Using 80 μg as the 'label claim' changes the recovered dose here to 81.9±6.9%. Furthermore, QVAR is the only inhaler studied where total recovery depends on the flow rate. When testing at 30 L/min, total recovery is 76.7±3.3% of the ex-actuator claim, whereas total recovery was 87.0±5.7% of the ex-actuator claim when testing at 60 L/min (p=0.00018). While the dose remaining in the actuator is not quantified in this study, it is surmised that there is increased deposition in the actuator at lower flow rates, possibly due to better entrainment of the aerosol plume at higher flow rates. In terms of mass of API, 65.5±5.5 μg per actuation (61.4±2.7 μg and 69.6±4.5 μg at 30 and 60 L/min, respectively) are recovered, a result that compares reasonably to those reported by who recovered 74.3±13.9 μg per actuation for QVAR. Finally, the recovered API is measured when actuating the inhaler directly into a filter through which 60 L/min is being generated by a downstream vacuum pump (n=3 replicate measurements). In these confirmatory tests 71.1±4.3 μg of API per actuation (88.9±5.3% of ex-actuator claim) are recovered, indicating that the mass of API recovered in the regional deposition measurements is typical for this particular inhaler.

The differences in regional deposition due to flow rate seen for each inhaler require considering more than just the particle dynamics of an inhaled aerosol. If particle dynamics alone dictated the regional deposition estimate, one might expect the TB fraction to increase with flow rate (due to increased deposition due to impaction) and thus cause the alveolar fraction to decrease. However, for QVAR the fraction of delivered dose reaching the alveolar region increases with flow rate while the TB dose remains relatively unchanged. The TB Filtration curve is relatively flat for the small particle sizes associated with the QVAR aerosol plume, a result that agrees with the small changes to TB Filtration. The increase in alveolar dose is due to reduced extrathoracic deposition, which in part results from improved entrainment of the aerosol plume. Most important is that this trend is captured consistently by both experimental methods. Liu et al. measured the droplet velocities and impaction forces of the aerosol plumes emitted from various pMDIs, including QVAR and Ventolin HFA. They showed that droplet velocities and plume impaction forces are positively correlated and significantly lower for the QVAR device than for the Ventolin HFA. While the droplet mass at impaction could not be measured, these measurements provide a good estimate of plume momentum, as is used by Ruzycki et al. to describe the dependence of extrathoracic deposition on inhaler orientation observed for the Ventolin Evohaler (equivalent to Ventolin HFA) but not for the QVAR device. The moderate difference in inhalation flow rate used in this study does not affect extrathoracic deposition for the relatively high momentum plumes of Ventolin HFA and Asmanex HFA. Combined with the larger particle sizes associated with these inhalers, the regional lung deposition estimates follow the expected trend of increasing TB deposition with flow rate. Overall, the expected change in TB deposition due to flow rate is well captured by the filter-based apparatus as compared to the in silico deposition model used here. It should be noted that, due to the use of a constant flow rate in this study, the effect on deposition due to flow rate identified here is void of any effects relating either to the shape of inhalation profile performed by the patient or to (in) coordination of inhaling and actuating the pMDI. These effects are eliminated in the present work both because doing so enables straightforward comparison of regional deposition estimates obtained at different flow rates and because the FBA has previously been validated for use with time varying inhalation profiles [41].

Further Conclusions

A novel, filter-based apparatus downstream of an Alberta Idealized Throat extrathoracic airway is used to fractionate the in vitro lung dose into TB and alveolar regional deposition estimates for various commercially available pMDI devices. The same devices are tested in a more conventional manner using an NGI to classify the in vitro lung dose, with the results then used as input to an in silico regional deposition model. The inhalers used here provide a wide variety of aerosol sizes (MMAD ranging from 0.9 to 3.3 μm) and were each tested at 30 and 60 L/min. The regional deposition estimates from each method are in good agreement, indicating the filter-based approach can capture effects due to particle size and inhalation flow rate while requiring far less time and fewer resources to perform. This approach therefore has the potential both to expedite research and development of novel inhalation therapies exploiting targeted delivery to a distinct region of the lungs, and to expedite comparisons of equivalence between innovator products and second-entry generics.

The references cited herein are hereby incorporated by reference in their entireties.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

CITED REFERENCES

Anderson, A. A. (1974 Mar. 5th). U.S. Pat. No. 3,795,135.

Brown, R. C. (1980). Porous Foam Size Selectors for Respirable Dust Samplers. *Journal of Aerosol Science,* 11 (2), 151-159.

Byron, P. R., Hindle, M., Lange, C. F., Longest, P. W., McRobbie, D., Oldham, M. J., . . . . Finlay, W. H. (2010). In Vivo—In Vitro Correlations: Predicting Pulmonary Drug Deposition from Pharmaceutical Aerosols. *Journal of Aerosol Medicine and Pulmonary Drug Delivery,* 23 (S2), S59-S69.

Chen, C.-C., Lai, C.-Y., Shih, T.-S., & Yeh, W.-Y. (1998). Development of Respirable Aerosol Samplers using Porous Foams. American Industrial Hygiene Association Journal, 59 (11), 766-773.

Chung, K. Y., Aitken, R. J., & Bradley, D. R. (1997). Development and Testing of a New Sampler for Welding Fume. The Annals of Occupational Hygiene, 41 (3), 355-372.

Clark, A., & Borgstrom, L. (2002). In Vitro Testing of Pharmaceutical Aerosols and Predicting Lung Deposition from In Vitro Measurements. In H. Bisgaard, C. OCallaghan, & G. C. Smaldone, Drug Delivery to the Lung (pp. 105-142). New York: Marcel Dekker.

Clark, P., Koehler, K. A., & Volckens, J. (2009). An Improved Model for Particle Deposition in Porous Foams. Journal of Aerosol Science, 40 (7), 563-572.

Courbon, P., Wrobel, R., & Fabries, J.-F. (1988). A new individual respirable dust sampler: the CIP 10. Annals of Occupational Hygiene, 32 (1), 129-143.

Davies, C. N. (1973). Air Filtration. London: Academic Press.

Finlay, W. H. (2001). The Mechanics of Inhaled Pharmaceutical Aerosols: An Introduction. San Diego: Academic Press.

Hickey, A. J. (2004). Chapter 11: Methods of Aerosol Particle Size Characterization. In A. J. Hickey, Pharmaceutical Inhalation Aerosol Technology (pp. 219-253). New York: CRC Press.

Hinds W C. Aerosol technology: Properties, behavior, and measurement of airborne particles. New York: Wiley; 1999.

ICRP. (1994). Human Respiratory Tract Model for Radiological Protection. ICRP Publication 66. Annals of the ICRP, 24 (1-3).

Koehler, K. A., & Volckens, J. (2013). Development of a Sampler to Estimate Regional Deposition of Aerosol in the Human Respiratory Tract. Annals of Occupational Hygiene, 57 (9), 1138-1147.

Kuo, Y.-M., Huang, S.-H., Shih, T.-S., Chen, C.-C., Weng, Y.-M., & Lin, W.-Y. (2005). Development of a Size-Selective Inlet-Simulating ICRP Lung Deposition Fraction. *Aerosol Science and Technology,* 39 (5), 437-443.

Marple, V. A., & Miller, N. C. (1994 Sep. 6). U.S. Pat. No. 5,343,767.

Marple, V. A., Roberts, D. L., & Liu, B. Y. (2002 Sep. 2). U.S. Pat. No. 6,453,758 B1.

Sleeth, D. K., Balthaser, S. A., Collingwood, S., & Larson, R. R. (2016 Mar. 7). Estimation of the Human Extrathoracic Deposition Fraction of Inhaled Particles Using a Polyurethane Foam Collection Substrate in an IOM Sampler. *International Journal of Environmental Research and Public Health,* 13 (3), 292.

Stapleton, K. W., Guentsch, E., Hoskinson, M. K., & Finlay, W. H. (2000). On the Suitability of kappa-epsilon Turbulence Modeling for Aerosol Deposition in the Mouth and Throat: A Comparison with Experiment. *Journal of Aerosol Science,* 31 (6), 739-749.

Tomyn, R. L., Sleeth, D. K., Thiese, M. S., & Larson, R. R. (2016). The Effect of Neutralized Particles on the Sampling Efficiency of Polyurethane Foam used to Estimate the Extrathoracic Deposition Fraction. *Journal of Occupational and Environmental Hygiene,* 13 (2), 133-140.

USP-NF. (2017). 42 (6) In-Process Revision: General Chapter <601> Inhalation and Nasal Drug Products: Aerosols, Sprays, and Powders-Performance Quality Tests. Rockville, MaryLand, USA: U.S. Pharmacopeial Convention.

Vincent, J. H., Aitken, R. J., & Mark, D. (1993). Porous Plastic Foam Filtration Media: Penetration Characteristics and Applications in Particle Size-Selective Sampling. *Journal of Aerosol Science,* 24 (7), 929-944.

1. Byron P R, Hindle M, Lange C F, Longest P W, McRobbie D, Oldham M J, et al. In vivo-in vitro correlations: Predicting pulmonary drug deposition from pharmaceutical aerosols. J Aerosol Med Pulm Drug Deliv. 2010; 23 Suppl 2:59-69. https://doi.org/10.1089/jamp.2010.0846
2. Martin A R. Regional Deposition: Targeting. J Aerosol Med Pulm Drug Deliv. 2021; 34 (1): 1-10. https://doi.org/10.1089/jamp.2021.29033.am
3. Usmani O S, Biddiscombe M F, Barnes P J. Regional Lung Deposition and Bronchodilator Response as a Function of B2-Agonist Particle Size. Am J Respir Crit Care Med. 2005; 172 (12): 1497-504. https://doi.org/10.1164/rccm.200410-14140C
4. Schlesinger R B, Lippmann M. Selective particle deposition and bronchogenic carcinoma. Environ Res. 1978; 15 (3): 424-31. https://doi.org/10.1016/0013-9351 (78) 90123-8
5. Koehler K A, Clark P, Volckens J. Development of a Sampler for Total Aerosol Deposition in the Human Respiratory Tract. Ann Occup Hyg. 2009; 53 (7): 731-8. https://doi.org/10.1093/annhyg/mep053
6. International Commision on Radiological Protection. Human respiratory tract model for radiological protection. A report of a task group of the International Commission on Radiological Protection. Ann ICRP. 1994; 24:1-482.
7. Newton A, Serdar B, Adams K, Dickinson L M, Koehler K. Lung deposition versus inhalable sampling to estimate body burden of welding fume exposure: A pilot sampler study in stainless steel welders. J Aerosol Sci. 2021; 153. https://doi.org/10.1016/j.jaerosci.2020.105721
8. Koehler K A, Volckens J. Development of a sampler to estimate regional deposition of aerosol in the human respiratory tract. Ann Occup Hyg. 2013; 57 (9): 1138-47. https://doi.org/10.1093/annhyg/met041
9. Yang M Y, Ruzycki C, Verschuer J, Katsifis A, Eberl S, Wong K, et al. Examining the ability of empirical correlations to predict subject specific in vivo extrathoracic aerosol deposition during tidal breathing. Aerosol Sci Technol. 2017; 51 (3): 363-76. https://doi.org/10.1080/02786826.2016.1262532
10. Ruzycki C A, Murphy B, Nathoo H, Finlay W H, Martin A R. Combined in Vitro-in Silico Approach to Predict Deposition and Pharmacokinetics of Budesonide Dry Powder Inhalers. Pharm Res. 2020; 37 (10). https://doi.org/10.1007/s11095-020-02924-7
11. Chrystyn H, Safioti G, Keegstra J R, Gopalan G. Effect of inhalation profile and throat geometry on predicted lung deposition of budesonide and formoterol (BF) in COPD: An in-vitro comparison of Spiromax with Turbuhaler. Int J Pharm. 2015; 491 (1-2): 268-76. https://doi.org/10.1016/j.ijpharm.2015.05.076

12. Finlay W H, Gehmlich M G. Inertial sizing of aerosol inhaled from two dry powder inhalers with realistic breath patterns versus constant flow rates. Int J Pharm. 2000; 210 (1-2): 83-95. https://doi.org/10.1016/S0378-5173 (00) 00569-X
13. Olsson B, Borgström L, Lundbäck H, Svensson M. Validation of a General in Vitro Approach for Prediction of Total Lung Deposition in Healthy Adults for Pharmaceutical Inhalation Products. J Aerosol Med Pulm Drug Deliv. 2013; 26 (6): 355-69. https://doi.org/10.1089/jamp.2012.0986
14. Tavernini S, Kiaee M, Farina D J, Martin A R, Finlay W H. Development of a filter that mimics tracheobronchial deposition of respirable aerosols in humans. Aerosol Sci Technol. 2019; 53 (7): 802-16. https://doi.org/10.1080/02786826.2019.1606414
15. Yu J, Wong J, Ukkonen A, Kannosto J, Chan H-K. Effect of Relative Humidity on Bipolar Electrostatic Charge Profiles of dry Powder Aerosols. Pharm Res. 2017; 34 (8): 1707-15. https://doi.org/10.1007/s11095-017-2178-3
16. Majid H, Madl P, Hofmann W, Alam K. Implementation of Charged Particles Deposition in Stochastic Lung Model and Calculation of Enhanced Deposition. Aerosol Sci Technol. 2012; 46 (5): 547-54. https://doi.org/10.1080/02786826.2011.645957
17. Koullapis P G, Kassinos S C, Bivolarova M P, Melikov A K. Particle deposition in a realistic geometry of the human conducting airways: Effects of inlet velocity profile, inhalation flowrate and electrostatic charge. J Biomech. 2015; 49 (11): 2201-12. https://doi.org/10.1016/j.jbiomech.2015.11.029
18. Finlay W H. The mechanics of inhaled pharmaceutical aerosols: an introduction. London: Academic Press; 2019.
19. Dorosz A, Żaczek M, Moskal A. Dynamics of aerosol generation and release-Dry powder inhaler performance considerations. J Aerosol Sci. 2021; 151. https://doi.org/10.1016/j.jaerosci.2020.105673
20. Hinds W C, Kennedy N J. An Ion Generator for Neutralizing Concentrated Aerosols. Aerosol Sci Technol. 2000; 32 (3): 214-20. https://doi.org/10.1080/027868200303740
21. Heenan A, Matida E, Pollard A, Finlay W. Experimental measurements and computational modeling of the flow field in an idealized human oropharynx. Exp Fluids. 2003; 35 (1): 70-84. https://doi.org/10.1007/s00348-003-0636-7
22. Johnstone A, Uddin M, Pollard A, Heenan A, Finlay W. The flow inside an idealised form of the human extra-thoracic airway. Exp Fluids. 2004; 37 (5): 673-89. https://doi.org/10.1007/s00348-004-0857-4
23. Delvadia R R, Wei X, Longest P W, Venitz J, Byron P R. In VitroTests for Aerosol Deposition. IV: Simulating Variations in Human Breath Profiles for Realistic DPI Testing. J Aerosol Med Pulm Drug Deliv. 2016; 29 (2): 196-206. https://doi.org/10.1089/jamp.2015.1215
24. Zhou Y, Sun J, Cheng Y-S. Comparison of Deposition in the USP and Physical Mouth-Throat Models with Solid and Liquid Particles. J Aerosol Med Pulm Drug Deliv. 2011; 24 (6): 277-84. https://doi.org/10.1089/jamp.2011.0882
25. Javaheri E, Shemirani F M, Pichelin M, Katz I M, Caillibotte G, Vehring R, et al. Deposition modeling of hygroscopic saline aerosols in the human respiratory tract: Comparison between air and helium-oxygen as carrier gases. J Aerosol Sci. 2013; 64:81-93. https://doi.org/10.1016/j.jaerosci.2013.04.010
26. Chan T L, Lippmann M. Experimental measurements and empirical modeling of the regional deposition of inhaled particles in humans. Am Ind Hyg Assoc J. 1980; 41 (6): 399-409. https://doi.org/10.1080/15298668091424942
27. Heyder J. Gravitational Deposition of Aerosol Particles within a System of Randomly Oriented Tubes. J Aerosol Sci. 1975; 6 (2): 133-7. https://doi.org/10.1016/0021-8502 (75) 90006-3
28. Heyder J, Gebhart J. Gravitational deposition of particles from laminar aerosol flow through inclined circular tubes. J Aerosol Sci. 1977; 8 (4): 289-95. https://doi.org/10.1016/0021-8502 (77) 90048-9
29. Ingham D B. Diffusion of Aerosols from a Stream Flowing through a Cylindrical Tube. J Aerosol Sci. 1975; 6 (2): 125-32. https://doi.org/10.1016/0021-8502 (75) 90005-1
30. Finlay W H, Lange C F, King M, Speert D P. Lung Delivery of Aerosolized Dextran. Am J Respir Crit Care Med. 2000; 161 (1): 91-7. https://doi.org/10.1164/ajrccm.161.1.9812094
31. Hill L S, Slater A L. A comparison of the performance of two modern multidose dry powder asthma inhalers. Respir Med. 1998; 92 (1): 105-10. https://doi.org/10.1016/S0954-6111 (98) 90040-3
32. Hindle M, Byron P R. Dose emissions from marketed dry powder inhalers. Int J Pharm. 1995; 116 (2): 169-77. https://doi.org/10.1016/0378-5173 (94) 00287-F
33. Hira D, Okuda T, Mizutani A, Tomida N, Okamoto H. In Vitro Evaluation of Optimal Inhalation Flow Patterns for Commercial Dry Powder Inhalers and Pressurized Metered Dose Inhalers With Human Inhalation Flow Pattern Simulator. J Pharm Sci. 2018; 107 (6): 1731-5. https://doi.org/10.1016/j.xphs.2018.02.002

The invention claimed is:

1. A regional lung deposition system comprising:

a throat simulation device;

an electrostatic neutralizer downstream of and in fluid communication with the throat simulation device;

a filter housing downstream of and in fluid communication with the electrostatic neutralizer; and a first filter positioned within the filter housing downstream of the throat simulation device and the electrostatic neutralizer.

2. The regional lung deposition system of claim 1 wherein the throat simulator device is an Alberta Idealized Throat.

3. The regional lung deposition system of claim 1 wherein the electrostatic neutralizer includes a housing.

4. The regional lung deposition system of claim 3 wherein the housing of the electrostatic neutralizer has a diameter of 75 mm.

5. The regional lung deposition system of claim 3 wherein the housing of the electrostatic neutralizer has an inlet that is configured to be attached to an outlet of the throat simulation device.

6. The regional lung deposition system of claim 5 wherein the inlet has a 16 mm diameter.

7. The regional lung deposition system of claim 1 wherein the electrostatic neutralizer includes an ion generator.

8. The regional lung deposition system of claim 1 further comprising a high-voltage lead attached to a stainless-steel ring.

9. The regional lung deposition system of claim 8 wherein the stainless-steel ring is provided in a housing of the electrostatic neutralizer.

10. The regional lung deposition system of claim 8 wherein the stainless-steel ring is a serrated stainless steel ring.

11. The regional lung deposition system of claim 8 wherein the stainless-steel ring is configured to produce corona discharge emitting ions into an annular region of high ion concentration.

12. The regional lung deposition system of claim 1 wherein the electrostatic neutralizer includes an annulus core axially aligned with an inlet of the electrostatic neutralizer.

13. The regional lung deposition system of claim 12 wherein the annulus core includes a flow disrupting collection dish.

14. The regional lung deposition system of claim 12 wherein the annulus core includes a pair of polytetrafluoroethylene discs.

15. The regional lung deposition system of claim 12 wherein the annulus core includes an inner electrode.

16. The regional lung deposition system of claim 15 wherein the inner electrode is axially centered with a high-voltage electrode ring provided in a housing of the electrostatic neutralizer.

17. The regional lung deposition system of claim 15 wherein the inner electrode has an axial length of 15 mm, an outer diameter of 45 mm, or a combination thereof.

18. The regional lung deposition system of claim 1 wherein the electrostatic neutralizer is configured to attach to the filter housing.

19. The regional lung deposition system of claim 1 wherein the first filter is configured to mimic in vivo tracheo-bronchial deposition in different regions of the human respiratory tract over the wide range of flow rates.

20. The regional lung deposition system of claim 1 further comprising a breath simulator downstream of and in fluid communication with an outlet of the filter housing.

* * * * *